United States Patent

Cimperman et al.

[11] Patent Number: 5,870,949
[45] Date of Patent: Feb. 16, 1999

[54] PITTING APPARATUS WITH BOX CAM; WIPING BLADE, OR SEPARATING ASSEMBLY

[75] Inventors: Frederick J. Cimperman, Dublin; Klaus Silbermann, Sunol, both of Calif.

[73] Assignee: Ashlock Company, A Division of Vistan Corporation, San Leandro, Calif.

[21] Appl. No.: 65,917

[22] Filed: Apr. 24, 1998

[51] Int. Cl.⁶ ............................... A23N 3/00; A23N 4/00; A23N 4/02; A23N 4/08
[52] U.S. Cl. .............................. 99/559; 99/549; 99/556; 99/560; 99/565
[58] Field of Search ...................... 99/490, 489, 547–566, 99/486; 426/484, 485; 198/384, 393, 397.06, 455, 803.9

[56] References Cited

U.S. PATENT DOCUMENTS

| | | | |
|---|---|---|---|
| 3,556,281 | 1/1971 | Margaroli | 198/384 |
| 3,618,648 | 11/1971 | Becq | 99/556 X |
| 3,738,257 | 6/1973 | Manfre et al. | 99/547 |
| 3,910,416 | 10/1975 | Payne | 99/490 X |
| 4,485,732 | 12/1984 | Goudard | 99/549 |
| 5,024,147 | 6/1991 | Petit et al. | 99/549 |
| 5,619,912 | 4/1997 | Silbermann | 99/559 |

OTHER PUBLICATIONS

Elliott Manufacturing Co., "Elliott Punch Pitting Machine," Brochure (2 pages)(1997).
Albritton, Richard, Elliott Manufacturing Co., Letter dated Oct. 21, 1997 and Quotation #1097–5359(7 pages).

Primary Examiner—Timothy F. Simone
Attorney, Agent, or Firm—Limbach & Limbach L.L.P.

[57] ABSTRACT

A fruit pitting apparatus including at least one of a box cam assembly for driving pitting knives relative to holders containing fruit, an active separating assembly which improves the efficiency of separation of the pitted fruit flesh from the holders after pitting, and a wiping blade positioned to wipe pits from the holders after pitting. The holders can be driven continuously during the pitting operation, or they can be driven intermittently so as to be stationary during pitting and to translate before and after pitting. The separating assembly preferably includes actively driven cam tracks within the knife driving assembly which vary the force with which the holders grip the fruit during and after pitting, especially when the holders are driven intermittently. The box cam assembly includes a box cam, a drive assembly for rotating the box cam, a pivot unit which undergoes reciprocating pivoting motion in response to the rotating box cam, a set of one or more shafts (to which pitting knives can be mounted) which reciprocate longitudinally in response to the reciprocating pivoting motion of the pivot unit, and preferably also a subassembly for causing the shafts to undergo reciprocating motion in directions perpendicular to their longitudinal axes.

13 Claims, 21 Drawing Sheets

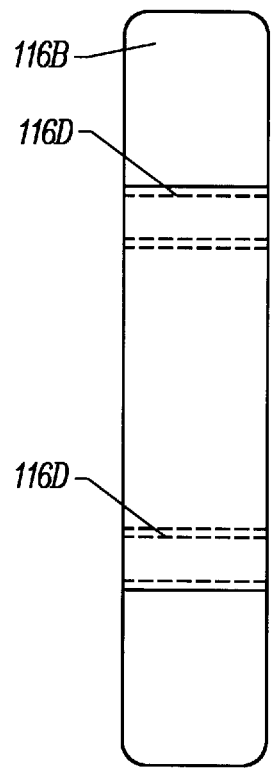
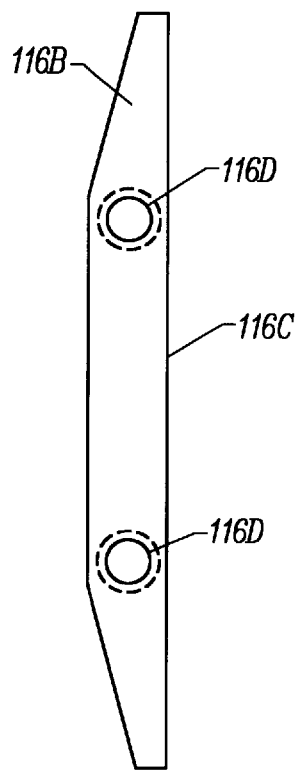
FIG. 27  FIG. 26
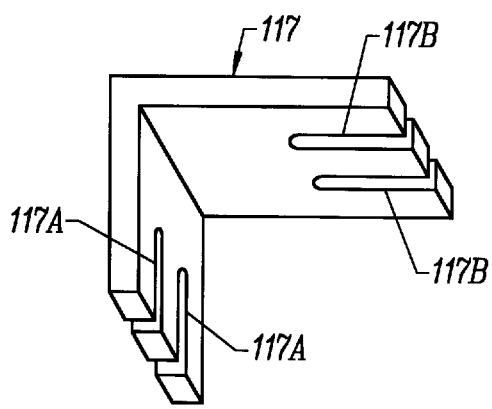
FIG. 28

PITTING APPARATUS WITH BOX CAM; WIPING BLADE, OR SEPARATING ASSEMBLY

FIELD OF THE INVENTION

The invention is an apparatus for removing pits from prunes or similar fruit such as dates. The apparatus of the invention translates prunes (or similar fruit) seated in holders to a set of pitting knives, and includes at least one of a box cam assembly for driving the pitting knives relative to the holders, an active separating assembly which improves the efficiency of separation of the pitted fruit flesh from pitting rubbers (of the holders) after pitting, and a wiping blade positioned to wipe pits from the holders after pitting. The separating assembly can include actively driven cam tracks within the knife driving assembly which vary the force with which the holders grip the fruit during and after pitting.

BACKGROUND OF THE INVENTION

One type of conventional prune pitting apparatus is described in U.S. Pat. No. 3,556,281, issued Jan. 19, 1971. FIG. 1 is a simplified side elevational view (partially cut away) of such an apparatus. FIG. 2 is a cross-sectional view of the FIG. 1 apparatus taken along line 2—2 of FIG. 1. The pitting apparatus of FIG. 1 includes a frame (with sideplates 12, legs 17, and pitting head housing 22), pulley and sprocket assembly 32, sprocket assembly 32D, disks 34, and two conveyor chains 35 looped around sprocket assemblies 32 and 32D and disks 34. Each of assemblies 32 and 32D is rotatably mounted to the frame. The drive mechanism comprises motor 24, speed reducer 26, pulley 23 (attached to a first shaft mounted for rotation relative to housing 22), pulleys 21A and 21B (attached to a second shaft mounted for rotation relative to housing 22), drive belt 28 looped around pulleys 23 and 21A, and drive belt 30 looped around pulley 21B and a pulley of assembly 32. In operation, motor 24 and speed reducer 26 cause pulley 23 to rotate clockwise (in FIG. 1), thus causing belt 28 to rotate both pulleys 21A and 21B clockwise and causing belt 30 to rotate assembly 32 clockwise. Rotating assembly 32 drives each of the conveyor chains 35 clockwise around a loop defined by sprocket assemblies 32 and 32D and disks 34. One of the chain loops is in the plane of FIG. 1, and the other chain loop is in a vertical plane parallel to the plane of FIG. 1. More specifically, as shown in FIG. 4, pulley and sprocket assembly 32 includes pulley 32B and sprockets 32C, all connected to shaft 32A. As belt 30 rotates pulley 32B, pulley 32B in turn rotates shaft 32A and sprockets 32C together as a unit, thereby driving chains 35 (each chain 35 being looped around one of sprockets 32C).

Fruit holders 36 (shown in FIG. 2) are connected between conveyor chains 35, so that the fruit holders 36 are conveyed around the loop as chains 35 are driven. A roller carrier 54 is attached at one end of each holder 36, and a roller carrier 56 is attached at the holder's other end. A roller 66 is attached to each carrier 54, and a roller 68 is attached to each carrier 56. Each fruit holder includes four pocket members 58 and four pocket members 60, which define four adjustable pockets (each pocket being dimensioned to hold firmly one of the prunes or other articles to be pitted when the pocket is in a closed configuration). Variable-length rods 50 extend between carriers 54 and 56, and a spring 62 is provided between holder 36 and each of carriers 54 and 56 to spring-load the rods into their maximum-length configuration (in which members 58 and 60 are oriented so as to hold the pockets in an open configuration). Members 58 and 60 are pivotably mounted to rods 50 so that when rods 50 are compressed by action of cams 84 (mounted along sideplates 12) on rollers 66 and 68, the members 58 and 60 pivot to decrease the size of (i.e., close) the pockets. When cams 80 allow springs 62 to move rods 50 to their elongated configuration, members 58 and 60 pivot in the opposite direction to increase the size of (i.e., open) the pockets.

FIG. 3 is a cross-sectional view of the FIG. 2 apparatus (with roller 68 omitted for clarity), taken along line 3—3 of FIG. 2, showing one of paddle wheels 38 sweeping across the pockets of a fruit holder 36. As shown in FIGS. 2 and 3, cams 80 are separated by a relative large distance, so that the pockets defined by fruit holders 36 are open when holders 36 translate past cams 80. As shown in FIG. 2, cams 84 are separated by a smaller distance so that the pockets defined by holders 36 are closed when holders 36 translate past cams 84. A third pair of cams (cams 85 and 85A, shown in FIGS. 4 and 5 but not in FIGS. 1 or 2) is also mounted to sideplates 12A in pitting head housing 22 to perform pocket opening and closing functions (to be described below) within housing 22. A fourth pair of cams (cam bars 111, one of which is shown in FIG. 1) is also mounted to side plates 12A between paddle wheels 38 and pitting head housing 22 to perform pocket opening and closing functions (to be described below). Cams 80 are mounted in positions in which they cause the pockets to open when holders 36 translate past hopper 14 (to allow the pockets to receive prunes or other articles). Cams 84 are mounted in positions in which they cause the pockets to close when holders 36 translate past paddle wheels 38. Cams 85 and 85A are mounted in positions in which they cause the pockets to close as holders 36 approach pitting knives within housing 22, and then to open briefly immediately after the pit removal operation (while the pitting knives remain engaged with the fruit in holders 36), and then to close again as holders 36 continue to move through housing 22 after the pit removal operation.

Typically, cams 80 are attached to the frame by adjustable mounts 82 so that the distance between cams 80 can be adjusted when desired (e.g., between processing of a batch of prunes of one average size and processing of another batch of prunes of a different average size). Similarly, cams 84 are attached to the frame by adjustable mounts 86, and cams 85 and 85A are attached to the frame by adjustable mounts 37 (shown in FIG. 4), so that the distance between cams 84 and between cams 85 and 85A can be adjusted when desired (e.g., in the same circumstances in which mounts 82 are adjusted).

Hopper 14 (having sideplates 16 and endwall 10) of the FIG. 1 apparatus is positioned so that the prunes, dates, or similar soft fruit to be pitted (e.g., prunes P shown in FIGS. 1 and 2) drop onto holders 36 as the holders pass under hopper 14. The FIG. 1 apparatus also includes hood 20 (which is supported above the upper end of hopper 14 and typically houses a water spray system for spraying water on the fruit translating past it) and paddle wheels 38. Paddle wheels 38 are rotatably mounted within hood 20, and are typically driven (by means not shown) to rotate sufficiently rapidly about their central axes (which are perpendicular to the plane of FIG. 1) so that the paddles of each wheel 38 sweep several times across each holder 36 as the holders 36 translate past the wheels 38. As indicated in FIG. 3, each time one of the paddles of wheel 38 sweeps across the pockets of a holder 36, protruding portions 78 of the paddle sweep through corresponding recesses 76 of the holder 36. Thus, paddle wheels 38 sweep out of the pockets any prunes (or other articles) that are not firmly seated (typically in a vertical orientation) between a pair of pocket members 58 and 60.

Each holder 36 has a lower plate 46 in which a pitting cup 70 is mounted at the location of each pocket (holder 36 shown in FIG. 3 has four cups 70, one at the location of each pocket). Pitting cups 70 are sometimes referred to as pitting rubbers, since they are typically made of rubber. Each cup 70 has a pit ejection opening 72 extending through it. Each holder 36 also has an upper plate 44 with a funnel-shaped opening 74 at the location of each pocket (for guiding an article into the pocket so as to rest on cup 70 between members 58 and 60). As shown in FIG. 3, one of conveyor chains 35 is attached to one side of plate 46 of each holder 36, and the other of chains 35 is attached to the other side of such plate 46.

In operation, prunes P (or dates or other articles to be pitted) fall from hopper 14 onto cups 70, as the conveyor translates holders 36 past the hopper, so that a prune (or other article) is loaded into each of at least some of the pockets defined by holders 36. The prunes (within holders 36) then translate past paddle wheels 38, and then through cam assembly 111 (shown schematically in FIG. 1). Assembly 111 comprises a pair of cam tracks 111A and 111B (also referred to herein as shaker bars), best shown in FIG. 2A.

Shaker bars 111A and 111B are cam tracks similar to above-described cam tracks 84, but each of bars 11A and 111B has periodically varying width and thus defines a scalloped (or other periodically varying) cam surface, whereas each cam 84 has uniform width (away from its ends) and thus defines a straight cam surface. Shaker bars 111A and 111B are mounted to sideplates 12 in positions in which they cause the pockets of each holder 36 to open and close rapidly and periodically as holders 36 translate past the shaker bars (i.e., as roller 66 of each holder 36 follows the cam surface of bar 111A and roller 68 of each holder 36 follows the cam surface of bar 111B). This periodic opening and closing of the pockets causes the articles to be pitted to settle completely into the pockets.

Assembly 111 also includes means for adjustably attaching shaker bars 111A and 111B to sideplates 12 of the frame. For example, adjustable mounts 186 (shown in FIG. 2A) can be provided, so that the distance between bars 111A and 111B can be adjusted when desired (e.g., in the same circumstances, described above, in which mounts 82 are adjusted to vary the spacing of cams 80). Alternatively, each of bars 111A and 111B is mounted to a plate (or angled bracket), and each plate (or bracket) has slots for receiving bolts for mounting the bar to the plate (bracket) and the plate (bracket) to the frame. When the bolts are loosened, each plate (bracket) can be repositioned relative to the frame (so that the slots translate relative to the bolts) and then fixed in the new position by re-tightening the bolts.

With reference again to FIG. 1, after holders 36 (and the prunes or other articles carried in their pockets) have translated past shaker bars 111 and into housing 22, a reciprocating pitting knife assembly in housing 22 engages the translating prunes (or other articles) to push out the pit from within each prune.

The pits either fall directly into chute 83 (shown in FIG. 4), or they are brushed away from the holders by a rotating brush assembly (to be described with reference to FIG. 4) and then fall into chute 83. The rotating brush assembly comprises rotatably mounted pit brush 61 (having paddles tipped with rubber), brush drive sprocket 59, brush drive shaft 63 (to which sprocket 59 is attached), and brush drive chain 64 looped around sprocket 59 and shaft 63. Sprocket 59 and above-described pulleys 21A and 21B are mounted to the same rotatable shaft. In response to rotation of sprocket 59 (with pulleys 21A and 21B) by motor 24, chain 64 rotates shaft 63, thereby actively rotating brush 61 relative to each of holders 36 translating away from the pitting knives so that the paddles of brush 61 sweep away any pits that may cling to the holders (so that the pits fall into pit chute 83).

Following pitting, as the holders exit the pitting head, the pockets defined by each holder are opened by cam assembly 216 (comprising a pair of pocket-opening cam tracks similar to above-described cam tracks 80) shown schematically in FIG. 1, and the pockets are then shaken by passing through shaker bar assembly 213 (comprising shaker bars similar to above-described bars 111A and 111B), to cause the pitted prunes fall out of the pockets.

The pitting knife assembly typically includes multiple rows of pitting knives (one row of knives for pitting fruit in each of two or more holders 36). Each row of pitting knives includes one knife for each pocket defined by one of the holders (e.g., one knife for each of the four pockets defined by holder 36). For example, in the apparatus of FIGS. 2–9 there are two rows of pitting knives, each row comprising four knives 102. The knives 102 in one row pit the prunes in one holder 36 while the knives in the other row simultaneously pits the prunes in another holder 36 (so that a total of eight prunes can simultaneously be pitted). A conventional implementation of such a knife assembly will be described with reference to FIGS. 4–8.

This conventional pitting knife assembly includes two shafts 4 which are fixedly mounted between vertically oriented plates 12A of housing 22 (as shown in FIGS. 7 and 8). A portion of the knife assembly of FIGS. 4–8 hangs from shafts 4 (in a manner to be explained below).

The knife assembly also includes rotatably mounted drive shaft 21, which is rotated about its axis by belt 28, which is in turn driven by motor 24. Cam 9 and eccentric 42 are fixedly mounted to shaft 21 (at different locations along the axis of shaft 21). To mount cam 9 to shaft 21, a channel (not shown) through cam 9 is aligned with an orifice (not shown) in shaft 21, and key 41' is inserted through the channel and tightened into the orifice.

Eccentric 42 is attached to eccentric shaft member 114, with eccentric 42 having freedom to rotate relative to member 114. As shaft 21 rotates about its longitudinal axis, eccentric 42 (which rotates as a unit with shaft 21) exerts force on member 114 which causes member 114 to undergo reciprocating motion as follows: the center of gravity of member 114 translates back and forth along an arc of a circle in the plane of FIG. 8, but member 114 does not rotate (about its center of gravity) in the plane of FIG. 8.

Member 114 is fixedly attached to a carriage comprising upper carriage plate 7, lower carriage plate 132, tie bar 30, and a pair of tie bars 8 (only one of bars 8 is shown in FIG. 7).

The carriage hangs from a pair of rotatably mounted swing arms 2. The upper end of each arm 2 is rotatably attached to one of parallel shafts 4. A pin 119 protrudes from the lower end of each arm 2 into a tube 120. Both tubes 120 are fixedly attached to lower carriage plate 132. Thus, as the carriage rocks back and forth (in response to rotation of eccentric 42), the carriage imparts this rocking motion to tubes 120 and pins 119, thus causing arms 2 to swing back and forth on fixed shafts 4. More specifically, as the carriage rocks, pins 119 translate reciprocally as a unit with tubes 120. During the reciprocal translation of pins 119 together with tubes 120, each pin 119 rotates relative to the tube 120 which surrounds it (about the common axis of the pin and the surrounding tube).

Two parallel plunger shafts 15 extend through upper carriage plate 7 and lower carriage plate 132, each with freedom to translate in the direction of its longitudinal axis relative to the plates 7 and 132. A pitting knife assembly (including four rows of pitting knives 102) is fixedly attached to the lower ends of shafts 15. Thus (assuming for the moment that shafts 15 are held fixed relative to the carriage), as the carriage (including plates 7 and 132) rocks back and forth, shafts 15 translate reciprocally as follows: the center of gravity of each shaft 15 translates back and forth along an arc of a circle in the plane of FIG. 8, but neither shaft 15 rotates (about its center of gravity) in the plane of FIG. 8.

However, the actual motion of shafts 15 (and the knives 102 fixedly attached thereto) is more complicated, because a mechanism (including cam 9 and rocker arm unit 33) provided to reciprocate shafts longitudinally relative to the carriage as the carriage rocks back and forth. Unit 33 includes top rocker arms 18, rocker spacer 19, bottom rocker arms 20, and rocker arm body 38, to be described below). The longitudinal motion of shafts 15 is timed relative to the swinging motion thereof (by the orientation of cam 9 relative to that of eccentric 42), so that the knives 102 undergo the following motion: knives 102 move longitudinally downward (into engagement with the prunes to be pitted) while the carriage swings in the direction of motion of the prunes (which corresponds to "toward the right" in FIG. 8), knives 102 then move longitudinally upward (until they are out of engagement with the prunes) while the carriage continues to swing in the direction of motion of the prunes, knives 102 then continue to move longitudinally upward while the carriage begins to swing in opposite direction (toward the left in FIG. 8), and finally knives 102 begin to move longitudinally downward (toward a new set of prunes to be pitted) while the carriage continues to swing in the direction opposite the direction of motion of the prunes.

Each knife 102 preferably has a groove 102A (a small diameter portion) near its tip (as shown in FIGS. 7 and 17). Each groove 102A defines shoulders which engage the fruit flesh when the knife is being withdrawn after pitting (to assist in separating the pitted fruit from the holder).

Next, with reference to FIGS. 5, 6, and 9, we describe the pitting operation in more detail (in an implementation in which motor 24 continuously translates holders 36 around the loop defined by sprocket assemblies 32 and 34). FIG. 5 shows a holder 36 and one row of four knives 102 in their lowest position (extending all the way through pitting rubbers 70 of the four pockets defined by the holder), in the position the knives would occupy immediately after pushing pits downward (through rubbers 70) from within four articles of fruit seated in the pockets. FIG. 6 shows one knife 102 of each of the two rows of knives 102, also in the lowest knife position. For clarity, portions of some of the holders 36 mounted on chains 35 are not shown in FIG. 6 (only the pitting rubbers 70 of the partially-shown holders 36 are visible in FIG. 6).

As shown in FIGS. 5 and 6, fruit stripping grill 94 is mounted (by brackets 94A) between plates 12A. After the pitting operation, as knives 102 move upward and to the right (when viewed as in FIG. 6) relative to fixedly mounted grill 34, the grill strips the pitted fruit from the knives. The pitting knives 102 then move back to the left (when viewed as in FIG. 6) away from grill 94. The holders (with pitted fruit) then translate to cam assembly 216 (which opens the spring-biased pockets of each holder) and then to cam assembly 213 (which shakes the pitted fruit from the pockets) so that the pitted fruit fall from the holders into a product bin or conveyor (not shown). Optionally, water is sprayed on the pitted fruit and on grill 94 (e.g., from spray pipe 37 and spray nozzle 48 shown in FIG. 4).

In the plane of FIG. 5 (corresponding to plane "A" of FIG. 9), cam tracks 85 and 85A (each mounted to one of plates 12A of housing 22 as shown in FIG. 5) are separated by a relative small distance, so that the pockets defined by holders 36 are closed to grip tightly the fruit being pitted. After the pitting step, each holder 36 of FIGS. 5 and 6 continues to translate (out of the plane of FIG. 5; toward the right in FIG. 6) until the holder (e.g., the holder 36 shown in FIG. 5) encounters notches 85B (best shown in FIG. 9) in cam tracks 85 and 85A. While each holder 36 translates between notches 85B, the holder's springs (springs 62, described with reference to FIG. 3) briefly relax and are then recompressed (thereby briefly opening the pockets). Knives 102 (which extend through the fruit in each pocket of the holder at the end of the pitting step) begin to translate upward while the pockets are briefly open. The brief opening of each pocket (in response to relaxation of the springs) releases pressure on the pitted fruit in each pocket, thereby allowing upward-translating knives 102 to strip the fruit from pitting rubbers 70 of the pockets before the pockets return to their closed configuration. This action improves the efficiency of separation of the pitted fruit from the holders (by assemblies 216 and 213) following pitting.

As noted, each of cam tracks 85 and 85A has a notch 85B. The cam tracks are mounted so that each holder 36 translates between input ends 89 of tracks 85 and 85A (shown in FIG. 9) before the pitting step, and then translates between notches 85B after the pitting step. Since there are two rows of pitting knives 102 which simultaneously pit fruit in two holders 36, one holder of each such pair of holders translates between the notches 85B immediately after the pitting step, and the second holder of each pair translates between notches 85B only after the first holder has done so. Typically, roller 66 at one end of each holder 36 is offset (in the direction in which holder 36 translates) from roller 68 at the other end of the holder 36. The notches 85B have length such that when rollers 66 and 68 of one holder 36 of a pair of adjacent holders are in plane A (indicated in FIG. 9), rollers 66 and 68 of the other holder 36 of the pair are in plane C of FIG. 9, and when rollers 66 and 68 of one holder 36 of the pair are in plane B of FIG. 9 (i.e., when the holder is between aligned notches 85B), rollers 66 and 68 of the other holder 36 of the pair are in plane D of FIG. 9 (i.e., the holder is between the aligned tapered ends of cam tracks 85 and 85A). Thus, just after knives 102 have pitted the fruit articles in a pair of adjacent holders 36 and at an instant when the knives 102 begin to move upward (away from the pitting rubbers 70), one of the holders (the "second" holder) is positioned in plane B of FIG. 9 (between notches 85B) with its pockets opened, and the other holder in the pair (the "first" holder) is positioned in plane D of FIG. 9 with its pockets also opened. Just before this moment, the rollers of the first holder had reached plane C of FIG. 9 where the first holder's pockets were held closed by tracks 85 and 85A (while pitting knives 102 moved downward into engagement with the fruit articles in the first holder to pit such fruit articles), while the rollers of the second holder reached plane A of FIG. 9 where the second holder's pockets were also held closed by tracks 85 and 85A (while the other row of pitting knives 102 moved downward into engagement with the fruit articles in the second holder to pit such fruit articles). More generally, as each pair of adjacent holders 36 translates along their looped path, the pockets of both holders are simultaneously closed (to perform the pitting operation), and then simultaneously opened (for a brief time while the knives begin to retract), and then simultaneously closed again (while the knives 102 continue to retract upward). Then, when the knives 102 have retracted sufficiently far upward so that their tips approach grill 94, the pockets open again (as the rollers of both holders have translated, toward the right in FIG. 9, beyond plane D) so that grill 94 can strip from knives 102 any pitted fruit that clings to the knives. Of course, the pockets should be open during the stripping step, so as not to reduce the efficiency with which the retracting knives separate from the pitted fruit.

In variations on the described embodiment in which rollers 66 and 68 of each holder 36 are aligned, cam tracks 85 and 85A should be mounted so that notches 85B are also aligned (so that planes A, B, C, and D of FIG. 9 would extend vertically, rather than at an angle from vertical as shown in FIG. 9).

Next, with reference again to FIGS. 7 and 8, we describe the manner in which cam 9 and rocker arm unit 33 cause shafts 15 to execute longitudinally reciprocating motion, thereby cyclically raising and lowering the pitting knives 102 attached to the lower ends of shafts 15. As best shown in FIG. 8, top rocker arm 18 and bottom rocker arm 20 of unit 33 are attached to each other at one end of unit 33 by rocker spacer 19 and at the other end of unit 33 by rocker arm body 38. One end of body 38 of unit 33 (comprising pin 112 shown in FIG. 8) is pivotally attached to stroke adjustment bearing screw 110 and stroke adjustment support bar 11. Element 110 is adjustably attached to support bar 11, and bar 11 is fixedly attached to one of frame plates 12A. With element 110 fastened in a selected position relative to bar 11, unit 33 is free to pivot reciprocally (both clockwise and counterclockwise in the plane of FIG. 8) about pin 112 in response to the forces alternately exerted thereon by rotating cam 9 and shafts 15 (which are spring-loaded as described below). Before operating the apparatus, screw 110 can be repositioned relative to bar 11 in order to change the position of pin 112 and unit 33 (and thus shafts 15 engaged with unit 33) relative to the frame of the apparatus during operation.

A cam follower 140 is attached to unit 33 between the fixed end of unit 33 (the end attached to pin 112) and the free end of unit 33 (the left end in FIG. 8). A cam follower 23 protrudes from each of shafts 15 into engagement with unit 33 (near unit 33's free end), so that when unit 33 pivots clockwise in FIG. 8, unit 33 pulls cam followers 23 upward (and thus unit 33 pulls shafts 15 longitudinally upward). Shafts 15 are spring-loaded by compressing two identical springs 126 between carriage plate 132 and spring centering members 129 (one member 129 is fixedly attached to each of shafts 15). The lower end of each spring 126 is held in position by a centering plug portion of plate 132.

The outer surface (cam surface) of cam 9 engages cam follower 140. When the large radius portion of cam 9 (the portion of cam 9 having greatest radial thickness relative to the central longitudinal axis of shaft 21) rotates into engagement with cam follower 140, cam 9 pushes follower 140 down, thus pivoting the arm unit 33 counterclockwise about pin 112, which causes arm unit 33 to pull cam followers 23 downward, which in turn translates shafts 15 longitudinally downward relative to the carriage. As shafts 15 translate longitudinally downward relative to the carriage, spring centering members 129 move downward (with shafts 15) relative to the carriage, thereby compressing springs 126.

Then, when continuing rotation of shaft 21 rotates the small radius portion of cam 9 (the portion of cam 9 having less radial thickness than does the large radius portion) into engagement with cam follower 140, compressed springs 126 relax (their length increases), thus pushing members 129 upward and causing shafts 15 to translate longitudinally upward relative to the carriage. As shafts 15 translate longitudinally upward relative to the carriage, cam followers 23 pivot arm unit 33 clockwise about pin 112. This pivoting motion of arm unit 33 pushes cam follower 140 upward so that cam follower 140 remains in contact with cam 9.

However, the conventional knife assembly described above has several limitations and disadvantages, including the following:

the knife assembly is undesirably spring-loaded (by compressing springs 126 between members 129 and carriage plate 132), and must remain spring-loaded in operation (which increases power consumption, which increases the cycle time of the periodic motion of shafts 15 and necessitates replacement of springs 126 from time to time as they wear out);

when motor 24 is turned off (after the knife assembly has been operating in response to rotation of shaft 21 by motor 24), springs 126 rapidly relax, thus driving shafts 15 longitudinally upward suddenly (this sudden action is potentially dangerous to workers in the vicinity of the apparatus, and increases wear and tear on the motor and other components of the apparatus, which in turn shortens the lifetime of the motor and other components);

when motor 24 is turned off, springs 126 rapidly pull driving shafts 15 longitudinally upward and hold shafts 15 (and the pitting knives attached thereto) in their fully raised position (this is inconvenient since the operator or service technician will sometimes prefer that the knives remain in a lowered position when the motor is turned off); and the pitting knife assembly's set up process is difficult in the sense that, not only must springs 126 be installed and compressed, but the proper relative orientation of cam 9 and eccentric 42 must be set to ensure that shafts 15 move longitudinally up and down in proper synchronization with the rocking motion of the carriage (typically two persons are needed to set up the apparatus);

the set up process of the apparatus is also difficult since actively rotating pit brush 61 must be appropriately oriented and its rotation appropriately timed (to avoid collisions between fruit holders 36 and paddles of brush 61 during operation); and actively rotating pit brush 61 is an expensive assembly that requires maintenance (including periodic replacement of its paddles).

Some conventional variations on the above-described pitting apparatus employ an intermittent fruit holder conveyor drive mechanism. In such variations, the fruit holders are translated into position for pitting, then remain stationary during pitting, and are then translated away from the pitting position. However, conventional pitting apparatus employing such an intermittent conveyor-drive have not efficiently separated the pitted fruit flesh (and pits) from the holders after pitting. An important factor contributing to this problem is that because the fruit is gripped tightly to accomplish the pitting operation, there is substantial friction between the pitting knife, fruit holder, and the fruit flesh both during the downward (pitting) stroke of each knife and the upward (retracting) knife stroke which follows the pitting stroke.

It had not been known until the present invention how to design an apparatus for pitting prunes or dates (or similar soft fruit) in a manner overcoming the disadvantages and limitations of the described conventional pitting apparatus.

It has been proposed to use a box cam in a pitting knife drive assembly See U.S. Pat. No. 5,619,912, issued Apr. 15, 1997 and assigned to the assignee of the present invention. However it has not been proposed to use a box cam in an apparatus for pitting prunes or dates (or similar soft fruit), in which the fruit is carried in holders having fruit-receiving pockets of controllable size, where each pocket must be opened and closed at different times during the processing cycle to grip and free the fruit sequentially in order to accomplish pitting efficiently. It had not been appreciated until the present invention that the efficiency of pitting of prunes, dates, and similar soft fruit can be significantly increased (with less waste due to fruit flesh and/or pits clinging to the fruit holders and fruit flesh being discarded with the ejected pits) if the pitting knives are driven using a box cam, and can be increased even more by driving the pitting knives using a box cam and also controlling the holder pockets to open briefly and then reclose following pitting (while the knives remain engaged with the pitted fruit).

SUMMARY OF THE INVENTION

In a class of preferred embodiments, the invention is an apparatus for removing pits from prunes (or similar soft fruit such as dates), including a pitting knife drive assembly, a set of one or more pitting knives driven by the drive assembly, and a conveyor assembly for seating the fruit in holders and translating the fruit and holders (continuously or intermittently) past the pitting knife set. The apparatus includes at least one of: a box cam assembly for driving the pitting knives relative to the holders to accomplish pitting; an active separating assembly which improves the efficiency of separation of pitted fruit and pits from the holders after pitting (in embodiments in which the holders are intermittently driven so as to be stationary when the pitting knives engage the fruit); and a fixedly mounted wiping blade positioned to wipe pits from the holders after pitting. The active separating assembly preferably includes cam tracks which are actively (e.g., pneumatically, or by solenoid) driven by a cam track actuator to vary the force with which the holders grip the fruit during and after pitting. For example, the active cam track drive assembly can cause the holders to open and close at appropriate times, including by opening briefly just after pitting while the pitting knives completely or partially retract from the pitted fruit).

In preferred embodiments, the holders translate continuously through the pitting area, and the knife driving assembly has a rotating box cam which causes the knives to execute reciprocating motion in which the knives move into engagement with the translating fruit (to remove pits therefrom) and then away from the pitted fruit as the fruit continues to translate. In embodiments which employ a box cam in the pitting knife drive assembly, the pitting knife drive assembly includes means for rotating the box cam, a pivot unit which undergoes reciprocating pivoting motion in response to the rotating box cam, and a set of one or more shafts (to which pitting knives can be mounted) which reciprocate longitudinally (in directions parallel to their longitudinal axes) in response to the reciprocating pivoting motion of the pivot unit. Preferably, the pitting knife assembly includes a subassembly for causing the shafts to undergo reciprocating motion in directions perpendicular to their longitudinal axes. A preferred implementation of the latter subassembly includes a carriage driven by a rotating eccentric, where the eccentric and the box cam are mounted along a common drive shaft, and the means for rotating the box cam include a motor for rotating the drive shaft (thereby rotating both the box cam and the eccentric).

BRIEF DESCRIPTION OF THE DRAWINGS

FIG. 26 is a top elevational view of cam track 116B of FIG. 11A.

FIG. 27 is a side elevational view of cam track 116B of FIG. 26.

FIG. 28 is a perspective view of mounting bracket 117 for track 116B of FIG. 26 (or track 116A of FIG. 11A).

DETAILED DESCRIPTION OF THE PREFERRED EMBODIMENTS

Figure 5:
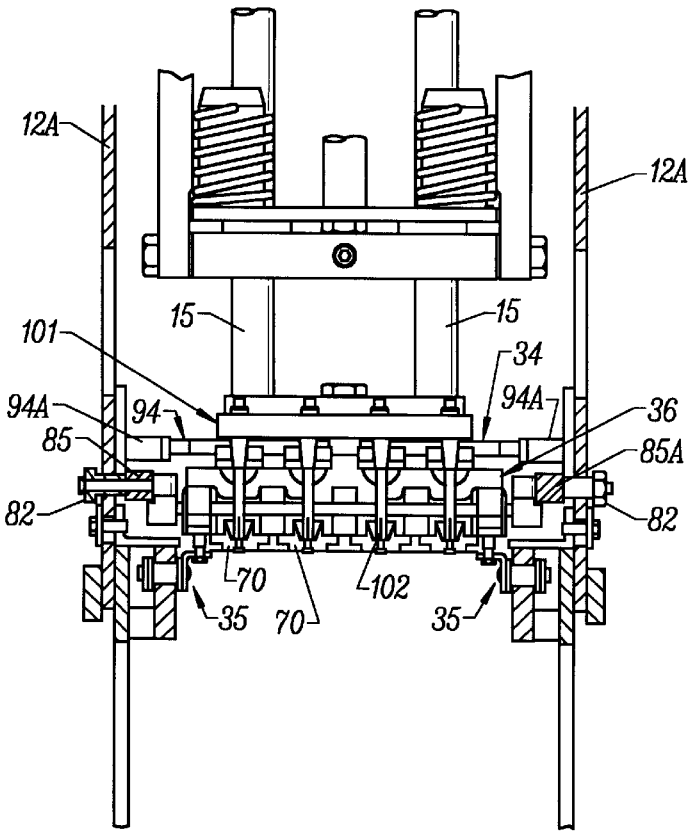
FIG. 5 is an enlarged view of a portion of the FIG. 4 assembly.
Figure 6:
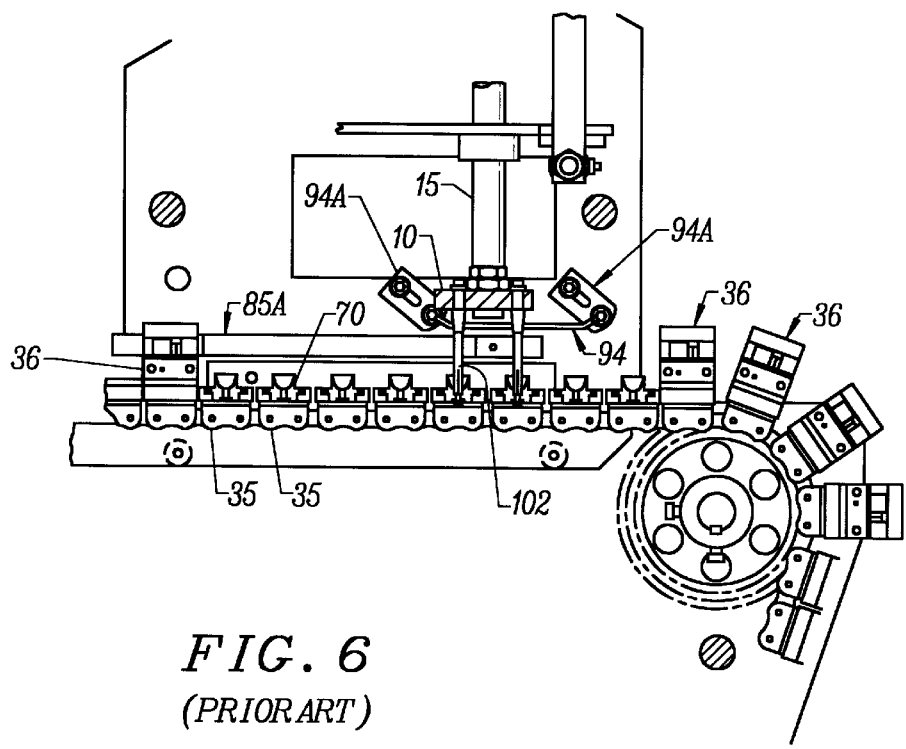
FIG. 6 is a cross-sectional view of a portion of the FIG. 4 assembly (in a vertical plane perpendicular to the plane of FIG. 4).

A preferred embodiment of the inventive pitting knife assembly will be described with reference to FIGS. 10–16, 11A, and 26–30. This embodiment includes pit wiper assembly 39 which replaces the conventional, actively driven, rotatably mounted pit brush 61 of the above-described apparatus of FIGS. 1–9. In one class of embodiments, the apparatus of FIGS. 10–16, 11A, and 26–30 includes a conventional knife drive assembly (of the type described above with reference to FIGS. 2–8). The apparatus of FIGS. 10–16, 11A, and 26–30 also includes notched cam tracks 85 and 85A (of the type described above with reference to FIGS. 5, 6, and 9, and further described below with reference to FIGS. 15 and 16).

All elements of the apparatus of FIGS. 10–16, 11A, and 26–30 which are identical to corresponding elements of the apparatus of FIGS. 1–9 are identically numbered in FIGS. 1–9, 10–16, 11A, and 26–30 and the foregoing description thereof will not be repeated with reference to FIGS. 10–16, 11A, and 26–30.

Figure 1:
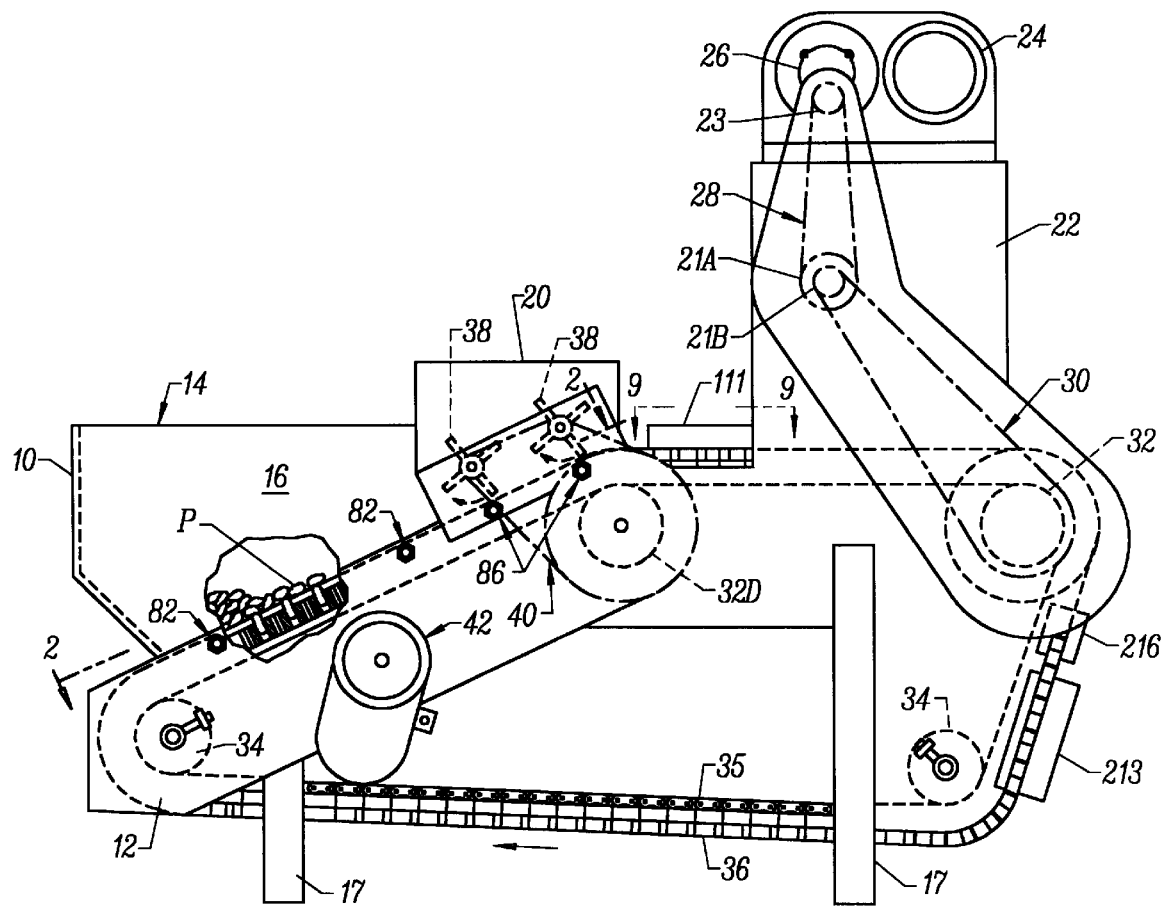
FIG. 1 is a side elevational view (partially cut away) of a conventional prune pitting apparatus.
Figure 2:
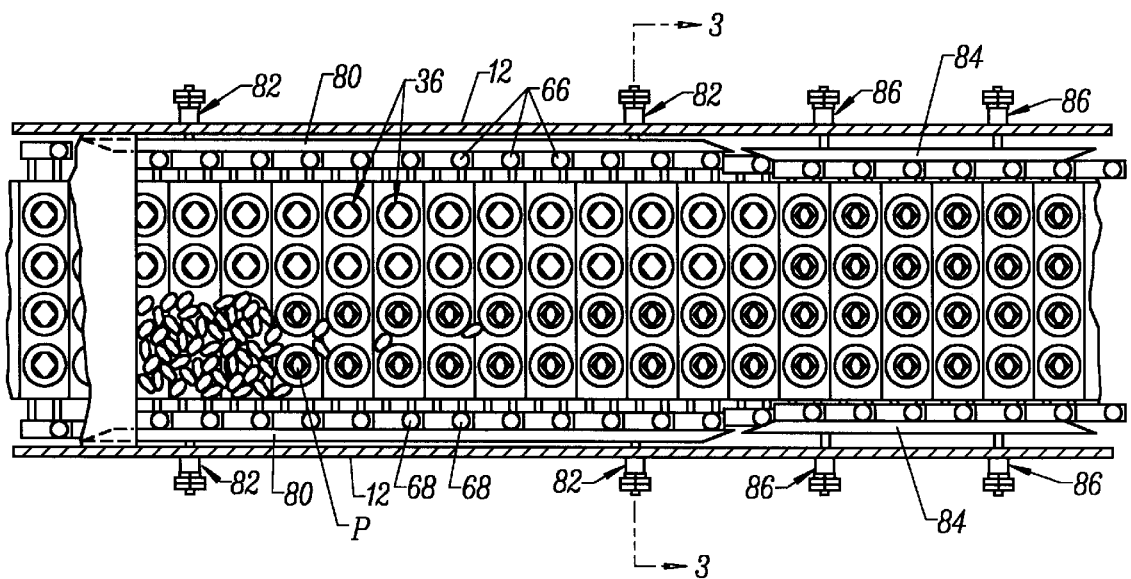
FIG. 2 is a cross-sectional view of a portion of the prune pitting apparatus of FIG. 1, taken along line 2—2 of FIG. 1.
Figure 2A:
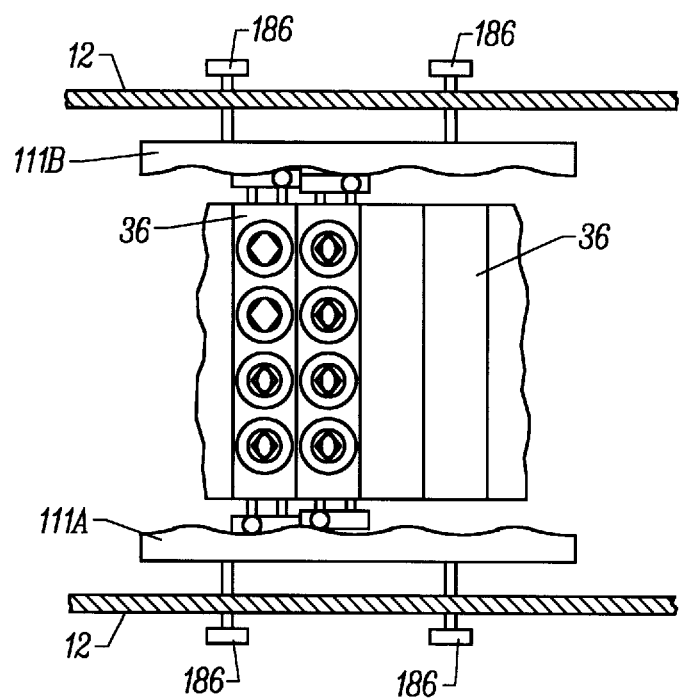
FIG. 2A is a cross-sectional view of a portion of the prune pitting apparatus of FIG. 1, taken along line 9—9 of FIG. 1.
Figure 3:
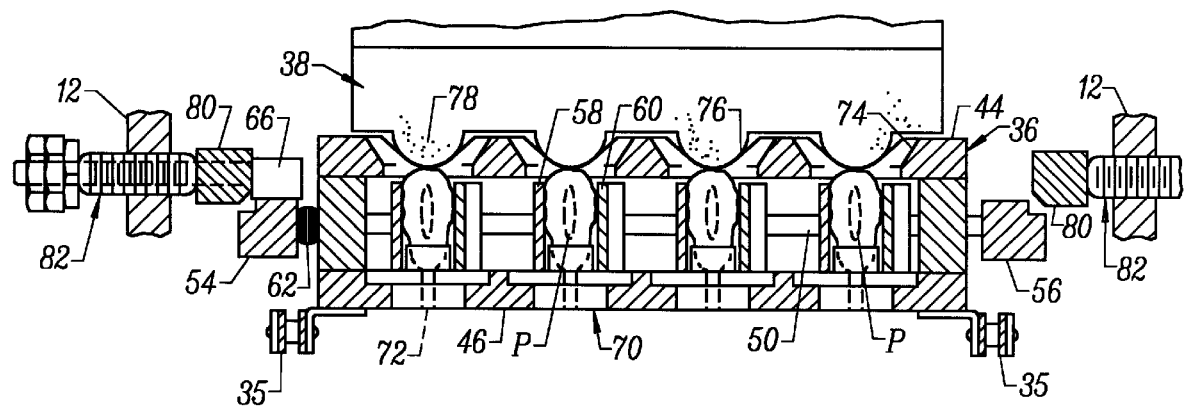
FIG. 3 is a cross-sectional view of the apparatus of FIG. 2 (with roller 68 omitted for clarity), taken along line 3—3 of FIG. 2, showing one of paddle wheels 38 sweeping across the pockets of one fruit holder 36.
Figure 4:
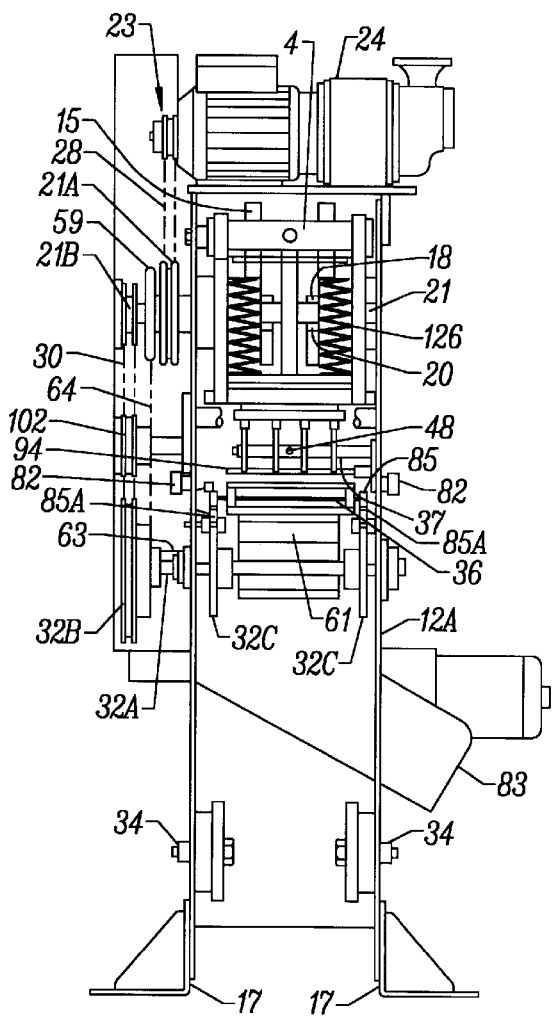
FIG. 4 is an end elevational view of a conventional pitting knife assembly of the type used in the FIG. 1 apparatus (with the pitting knives in a lowered position).
Figure 10:
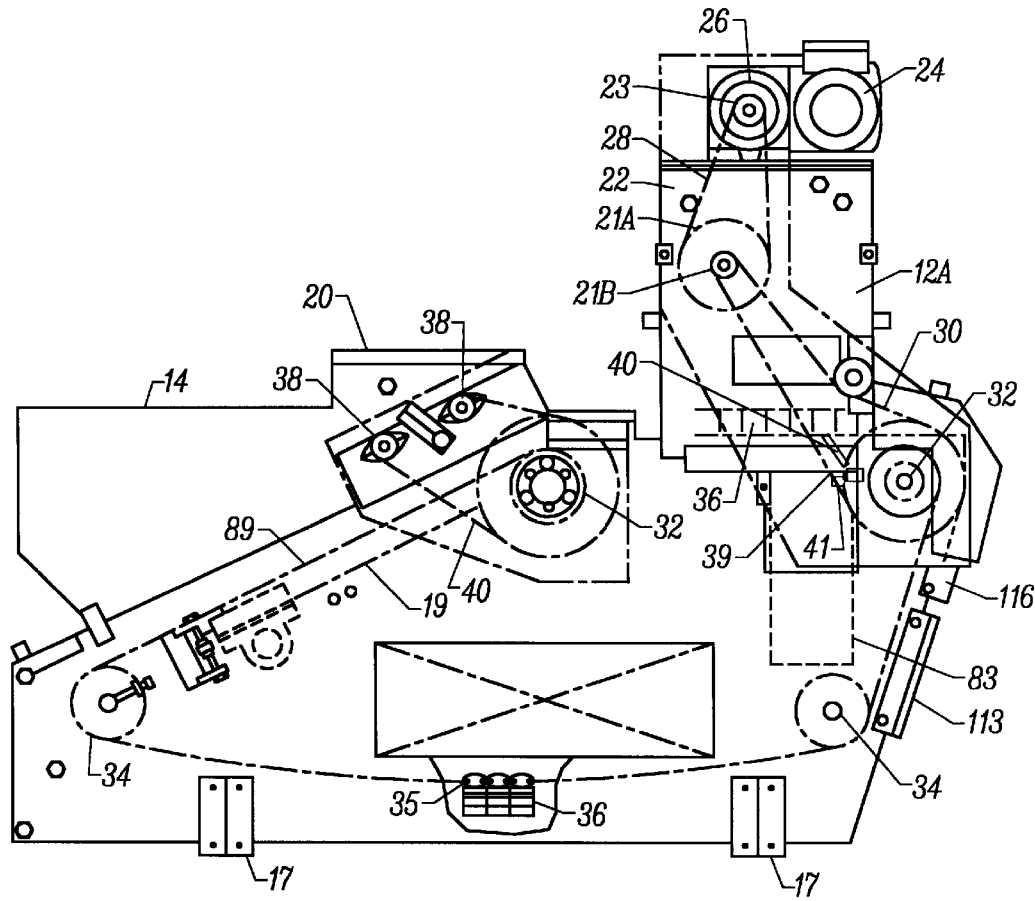
FIG. 10 is a side elevational view (partially cut away) of a preferred embodiment of a prune pitting apparatus in accordance with the invention.
Figure 11:
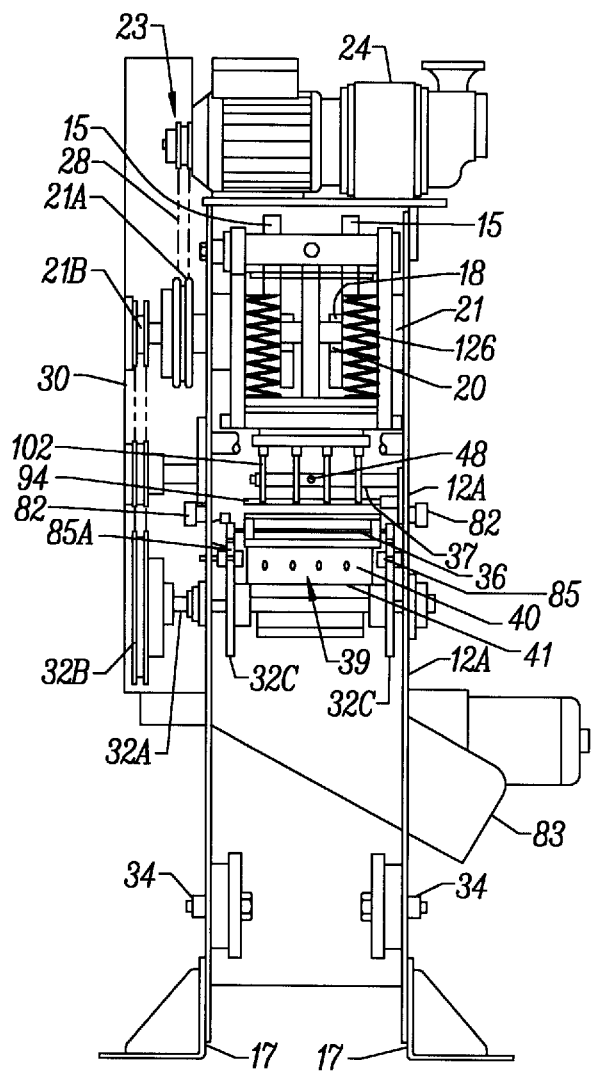
FIG. 11 is an end view of a portion of the FIG. 10 apparatus (with assemblies 113 and 116 of FIG. 10 omitted for clarity).

The principal difference between the pitting apparatus of FIGS. 10 and 11 and that of FIGS. 1 and 4 is that the apparatus of FIGS. 10 and 11 includes pit wiper assembly 39 in place of rotatably mounted pit brush 61, shaft 63, drive sprocket 59, and brush drive chain 64. Wiper assembly 39 is fixedly mounted in a position above pit discharge chute 83 and just below the bottom surfaces of fruit holders 36, to wipe any clinging pits from each passing holder 36 as the holder translates above bin 83 following the operations of pitting and post-pitting disengagement of pitting knives 102 from the holder.

Figure 10A:
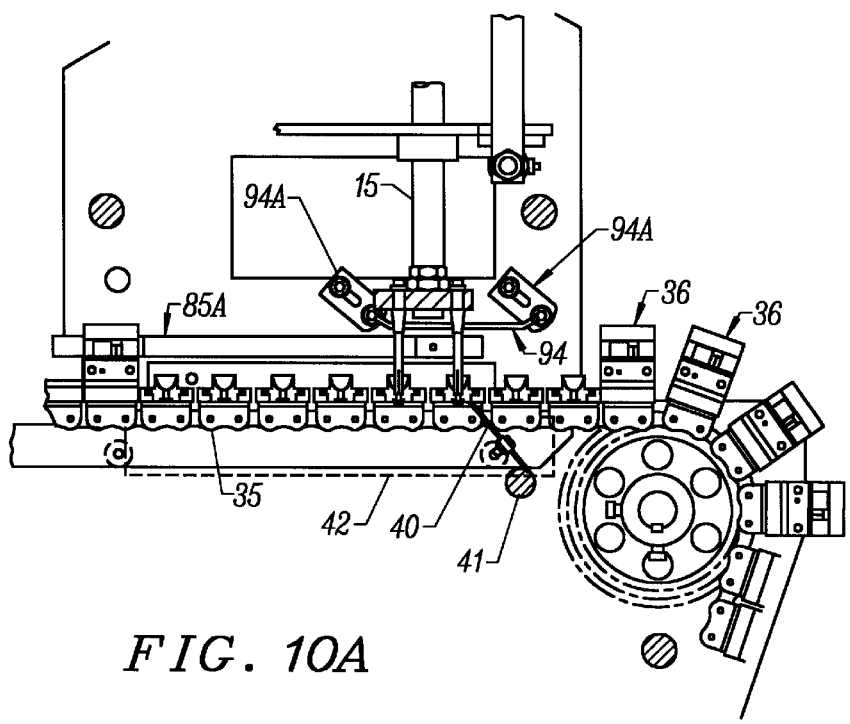
FIG. 10A is an enlarged cross-sectional view of a portion of the FIG. 10 assembly (in a vertical plane parallel to the plane of FIG. 10).

Pit wiper assembly 39 comprises two mounting bars 42, mounting rod 41 connected between bars 42, and wiping blade 40 mounted to rod 41. As shown in FIG. 10A, each bar 42 is fixedly attached to a respective one of plates 12A such that blade 40 is oriented at an angle of 30 degrees (or an angle substantially equal to 30 degrees) from vertical in an inclination toward the approaching holders (i.e., with the working edge of the blade rotated clockwise with respect to rod 41 by about 60 degrees from horizontal). Blade 40 is mounted such that each holder 36 translates past blade 40 after the pitting knife assembly has performed a pitting operation on the fruit carried in the holder's pockets, so that blade 40 wipes away any pits clinging to the holder.

Figure 12:
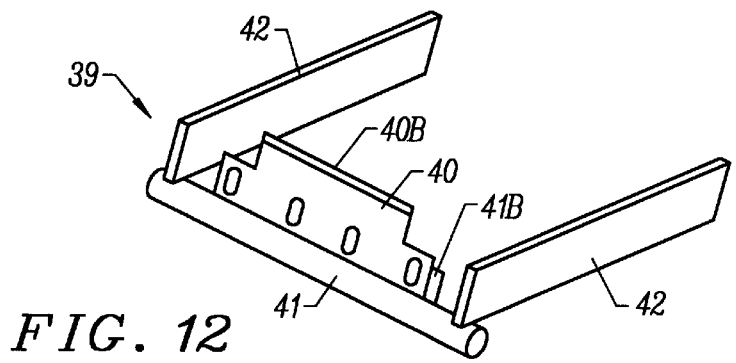
FIG. 12 is a perspective view of a wiping blade assembly used in the FIG. 10 apparatus.
Figure 13:
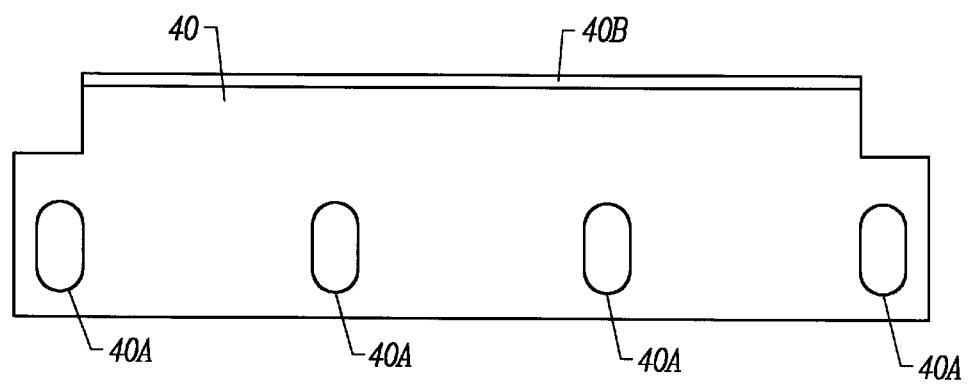
FIG. 13 is an elevational view of the blade of the FIG. 12 assembly.
Figure 14:
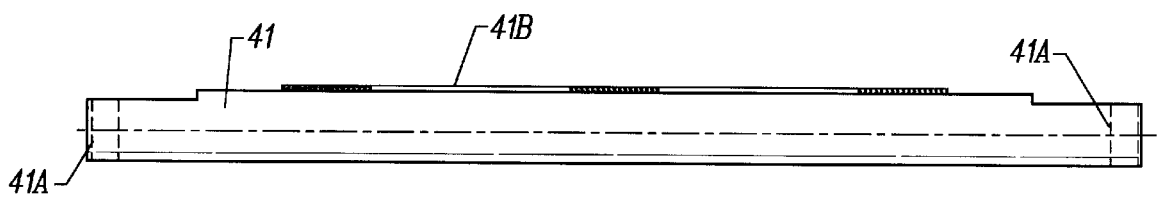
FIG. 14 is an elevational view of the blade mounting rod of the FIG. 12 assembly.

FIG. 12 is a perspective view of wiper assembly 39 of FIGS. 10, 10A, and 11. Assembly 39 comprises mounting bars 42, mounting rod 41 connected between bars 42 (e.g., by bolts extending through threaded holes 41A in rod 41, into bars 42), and wiping blade 40 mounted to rod 41 (e.g., by bolts through holes 40A of blade 40 and matching holes through flat mounting portion 41B which protrudes from rod 41). Each bar 42 is fixedly attached to a respective one of plates 12A such that blade 40 is oriented at an angle of 30 degrees (or an angle substantially equal to 30 degrees) from vertical in an inclination toward the approaching holders (i.e., with the working edge of the blade rotated clockwise with respect to rod 41 by about 60 degrees from horizontal, as shown in FIG. 10). Blade 40, as well as elements 41 and 42 are preferably made from stainless steel. Blade 40 preferably has a flat body (oriented in the plane of FIG. 13) and a beveled working edge which defines a surface 40B. When assembly 39 is properly mounted to plates 12A, surface 40B is preferably oriented parallel to the bottom faces of holders 36 (i.e., surface 40B is oriented horizontally when the apparatus is viewed as in FIG. 10).

In preferred implementations of the FIG. 10 apparatus in which holders 36 translate continuously around the loop defined by chains 35 (even during pitting), the FIG. 10 apparatus preferably includes notched cam tracks 85 and 85A of the same type as described above with reference to FIGS. 2–9.

Figure 15:
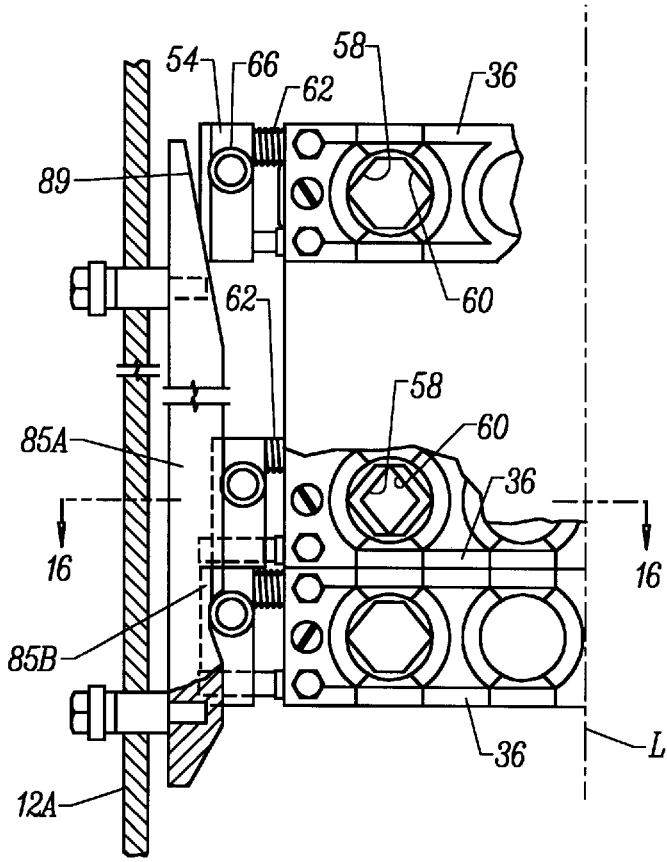
FIG. 15 is a top elevational view of a portion of an implementation of the FIG. 10 apparatus which includes notched cam tracks 85 and 85A.
Figure 16:
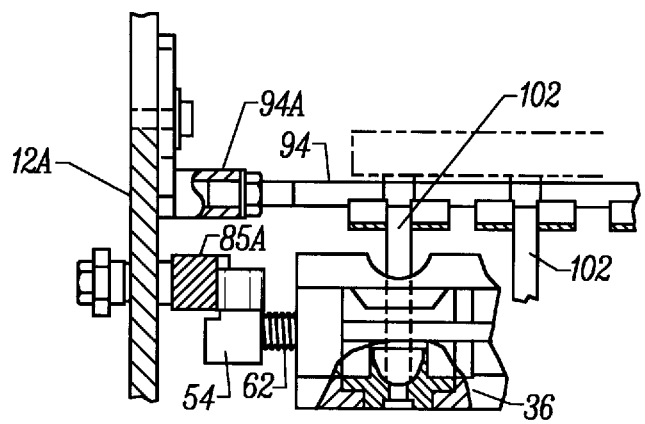
FIG. 16 is a cross-sectional view (along line 16—16 of FIG. 15) of the FIG. 15 apparatus.

Next, with reference to FIGS. 15–16, we describe the manner in which the notches in tracks 85 and 85A cause holders 36 to move in relation to pitting knives 102. FIG. 15 shows track 85A and half of each of several holders 36 (it should be understood that track 85 is symmetrically mounted on the other side of center line L of FIG. 15, and that each holder 36 has four adjustable pockets, each adjustable pocket defined by a pair of spring-loaded pocket members 58 and 60). When a holder 36 enters pitting head housing 22, it initially translates past the aligned input ends 89 of cam tracks 85 and 85A (as the top holder 36 in FIG. 15 is shown doing). Since the distance between tracks 85 and 85A at input ends 89 is relatively large, each spring 62, mounted between the main body of holder 36 and carrier 54 (or 56) at the end of holder 36 to spring-load the pockets into their open configuration, is relaxed in its elongated configuration (and rods 50 extending between carriers 54 and 56 are elongated) when the holder translates past the input ends 89. Thus, the holder's pockets are in their open configuration (as are the pockets of the top holder 36 in FIG. 15).

Then, when each holder 36 advances between cam tracks 85 and 85A past the input ends 89, the separation between the cam tracks decreases, and so the action of the cam tracks on carriers 54 and 56 shortens rods 50 (and compresses springs 62) to move the pockets into their closed configuration (as are the pockets of the second holder 36 from the bottom of FIG. 15). In this state, the pitting knives engage the fruit gripped in the pockets to eject the pits from the fruit.

Then, when each holder 36 advances between the notched portions 85B of cam tracks 85 and 85A, the separation between the cam tracks increases, and springs 62 relax into their elongated state, thus lengthening the rods 50 and moving the pockets into their open configuration (as are the pockets of the bottom holder 36 shown in FIG. 15). The notched portions 85A are sized and positioned so that the pockets open briefly after the pit removal operation (while the pitting knives remain engaged with the fruit in the pockets) to improve the efficiency with which the knives are withdrawn from the fruit and the pitted fruit flesh is separated from the pockets, and the pockets then close as holders 36 continue to move along tracks 85 and 85A past notches 85B. As explained above with reference to FIG. 9, when multiple rows of pitting knives simultaneously pit fruit in two or more holders 36, these holders sequentially translate past notches 85B but all do so while the pitting knives remain engaged with the pitted fruit carried by them (to improve the efficiency with which the pitted fruit flesh is separated from each of the holders carrying said flesh).

As shown in FIG. 16, fruit stripping grill 94 (mounted by brackets 94A between plates 12A) is positioned to strip from knives 102 any pitted fruit flesh which clings to knives 102 after the pitting operation, as knives 102 retract upward away from vertically fixed holder 36 through holes in fixedly mounted grill 94. Typically, most (or all) of the pitted fruit flesh falls from the knives 102 before the knives 102 reach grill 94.

Figures 29, 30:
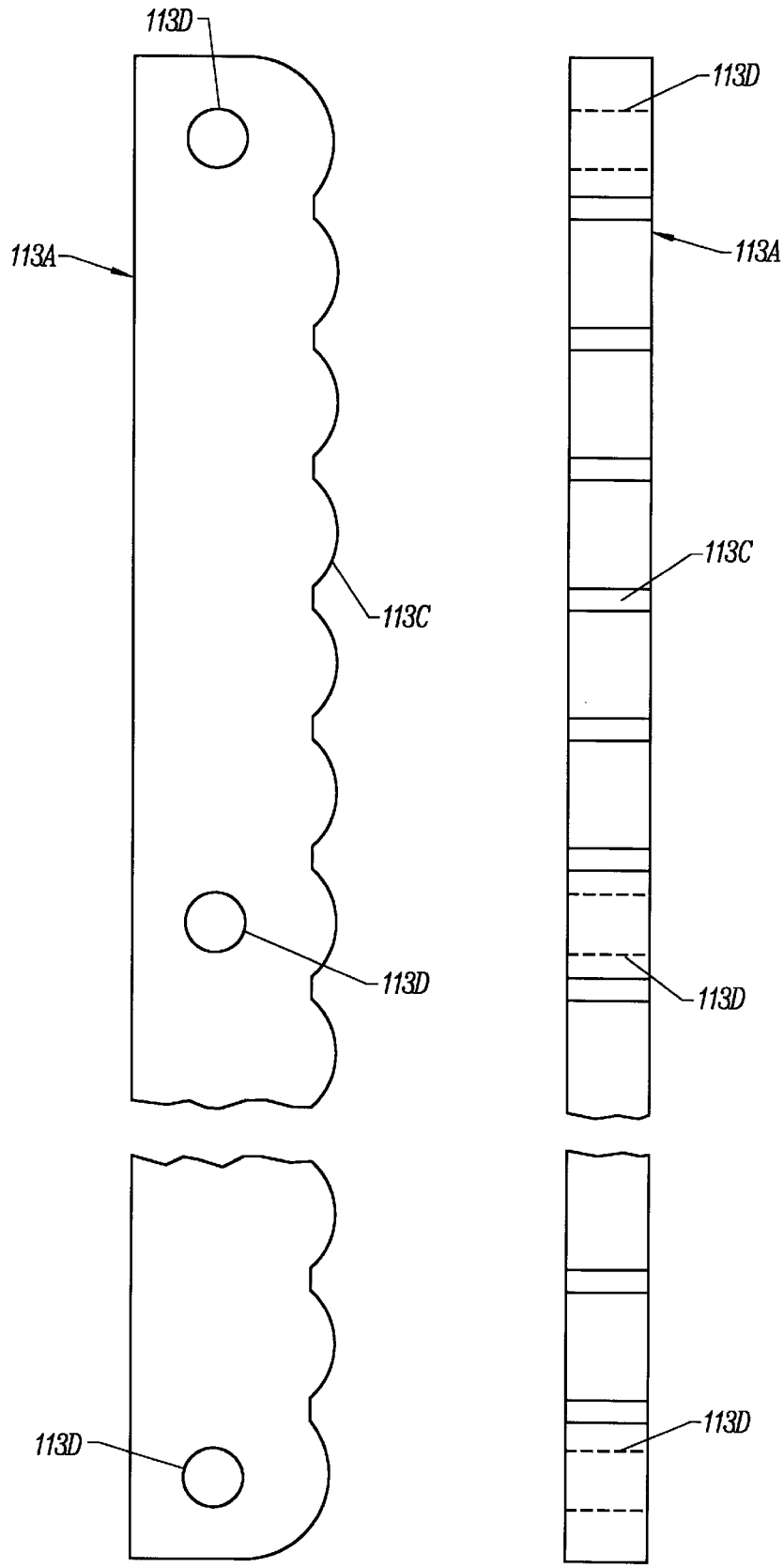
FIG. 29 is a top elevational view of bar 113A of FIG. 11A.
FIG. 30 is a side elevational view of bar 113A of FIG. 29.
Figure 3:
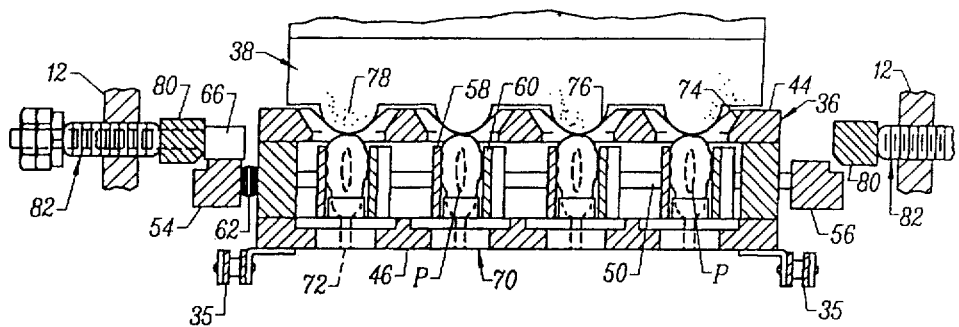
Figure 4:
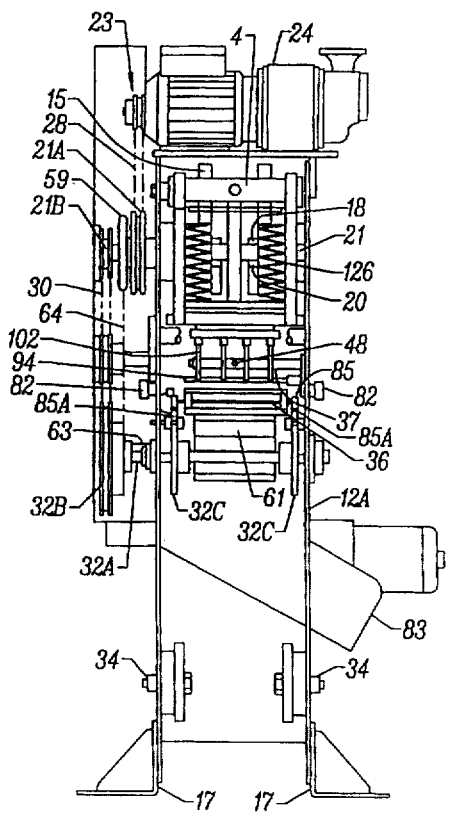
Figure 19:
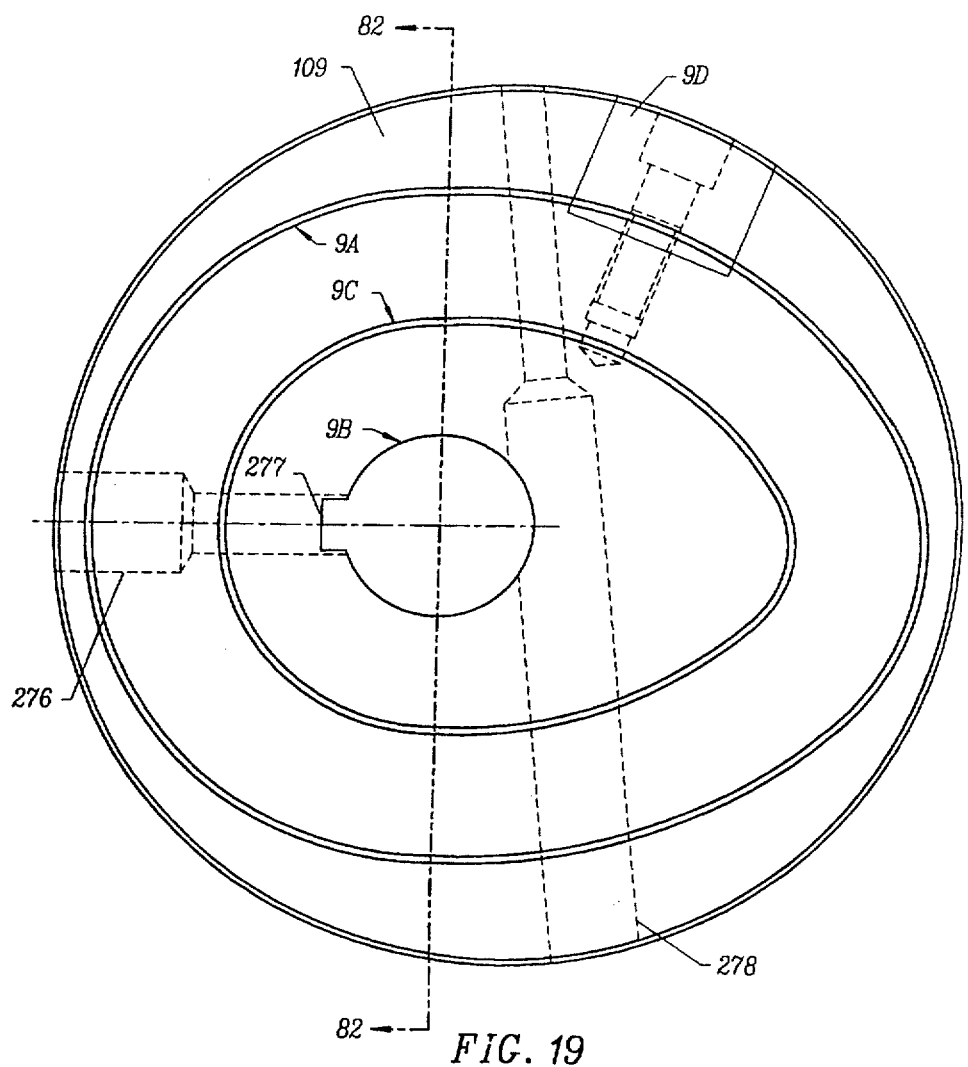
Figure 11A:
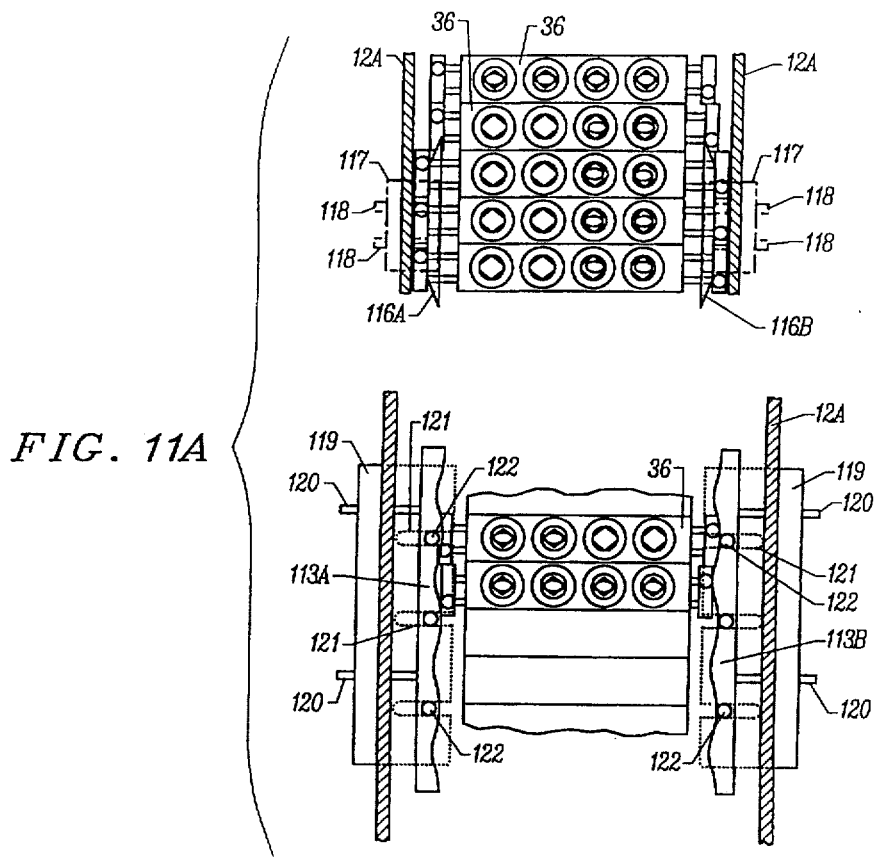
Figure 17:
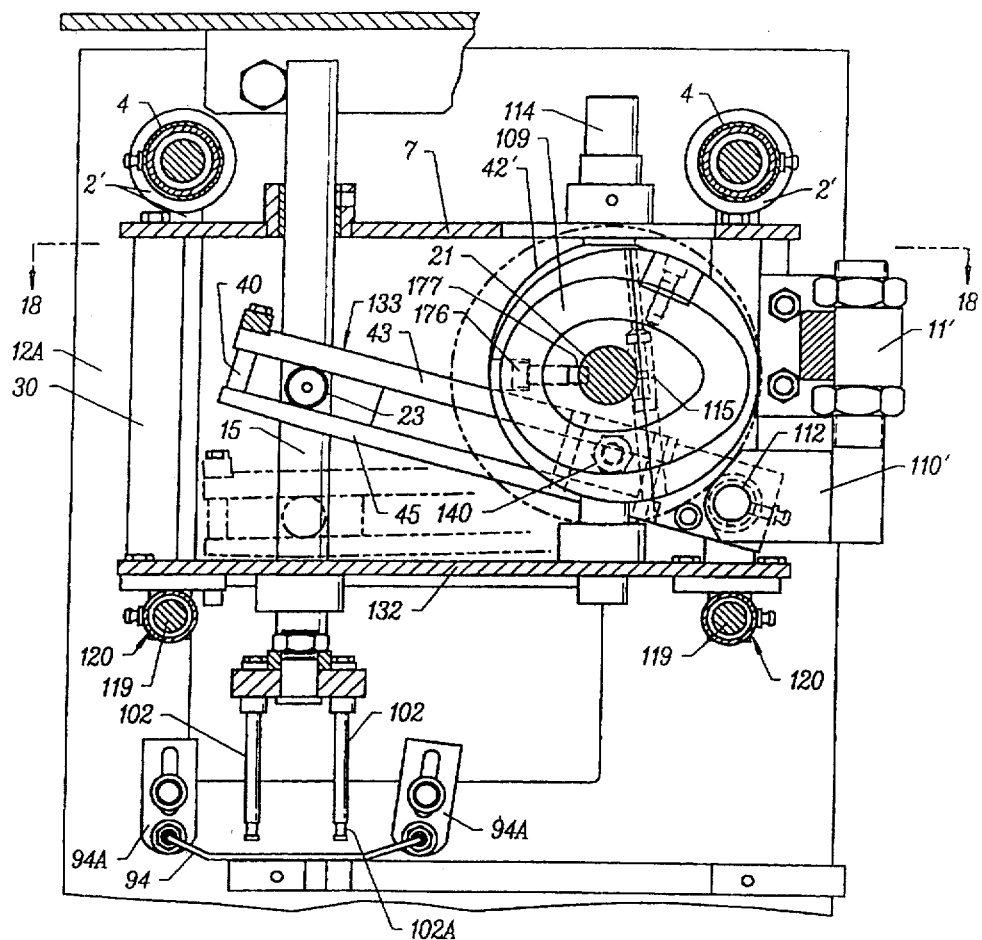

Following pitting, as holders 36 exit the pitting head, the pockets defined by each holder are opened by cam assembly 116 (comprising a pair of pocket-opening cam tracks 116A and 116B to be described with reference to FIGS. 11A and 26–28), and the pockets are then shaken by passing through shaker bar assembly 113 (comprising shaker bars 113A and 113B to be described with reference to FIGS. 11A, 29, and 30), to cause the pitted prunes fall out of the pockets.

Assemblies 113 and 116 are shown schematically in FIG. 10, and will be described with reference to FIGS. 11A and 26–30. FIG. 11A is an end view of a portion of the FIG. 10 apparatus, showing assemblies 113 and 116 and some of the holders 36 translating away from the pitting knife assembly (but not showing the elements shown in FIG. 11).

The shape and function of cam tracks 116A and 116B (of assembly 116) are similar to the shape and function of above-described tracks 80. As shown in FIG. 26, cam track 116B has a straight cam surface 116C (on which rollers 68 of holders 36 ride). Track 116A can have the same shape as track 116B, but they are mounted with their cam surfaces facing each other. As shown in FIGS. 26 and 27, mounting holes 116D extend through cam track 116B so that bolts can be inserted through holes 116D to mount track 116B to plate 117.

Cam tracks 116A and 116B are mounted to sideplates 12A of the frame in positions in which they allow the spring-biased pockets of each holder 36 to open, as holders 36 translate between the opposed cam surfaces of the tracks (i.e., as roller 66 of each holder 36 follows the cam surface of track 116A and roller 68 of each holder 36 follows the cam surface of track 116B).

Assembly 116 preferably includes means for adjustably attaching tracks 116A and 116B to sideplates 12A. For example, in the FIG. 11A embodiment, each of tracks 116A and 116B is mounted to L-shaped angled bracket 117. Bracket 117 is shown in simplified phantom view in FIG. 11A but is shown in more detail in FIG. 28. Bracket 117 has slots 117A in one of its major surfaces for receiving bolts for mounting track 116B (or 116A) to bracket 117, and slots 117B in its other major surface for receiving bolts 118 (shown in FIG. 11A) for mounting bracket 117 to one of sideplates 12A of the frame. When bolts 118 are loosened, bracket 117 can be repositioned relative to the frame (slots 117B are translated relative to the bolts and the frame) and then fixed in the new position by re-tightening the bolts.

Shaker bars 113A and 113B of assembly 113 are cam tracks similar to above-described bars 111A and 111B. As best shown in FIG. 29, cam track 113A has periodically varying width and thus defines a scalloped cam surface (on which rollers 66 of holders 36 ride). In variations on the design shown, the shaker bars have periodically varying cam surfaces with profiles different than that of surface 113C. Bar 113B can have the same shape as bar 113A, but they are mounted with their cam surfaces facing each other. As shown in FIGS. 29 and 30, mounting holes 113D extend through bar 113A so that bolts can be inserted through holes 113D to mount bar 113A to plate 117.

Shaker bars 113A and 113B are mounted to sideplates 12A of the frame in positions in which they cause the spring-biased pockets of each holder 36 to open and close rapidly and periodically as holders 36 translate past the shaker bars (i.e., as roller 66 of each holder 36 follows the cam surface of bar 113A and roller 68 of each holder 36 follows the cam surface of bar 113B). This periodic opening and closing of the pockets shakes the pitted articles from the pockets, causing the pitted articles to fall efficiently from the pockets.

Assembly 113 preferably includes means for adjustably attaching bars 113A and 113B to sideplates 12A. For example, in the FIG. 11A embodiment, each of bars 113A and 113B is mounted to L-shaped angled bracket 119. Bracket 119 is shown in phantom view in FIG. 11A, and can have generally the same shape as does above-described bracket 117 (although it may be longer and have more holes bored through it). Bracket 119 has slots 121 in one of its major surfaces for receiving bolts 122 for mounting bar 113A (or 113B) to bracket 119, and slots (not shown) in its other major surface for receiving bolts 120 (shown in FIG. 11A) for mounting the bracket 119 to one of sideplates 12A of the frame. When bolts 122 are loosened, bracket 119 can be repositioned relative to the frame (slots 121 are translated in the plane of FIG. 11A relative to bolts 122 and to the frame) and then fixed in the new position by re-tightening the bolts.

Figure 7:
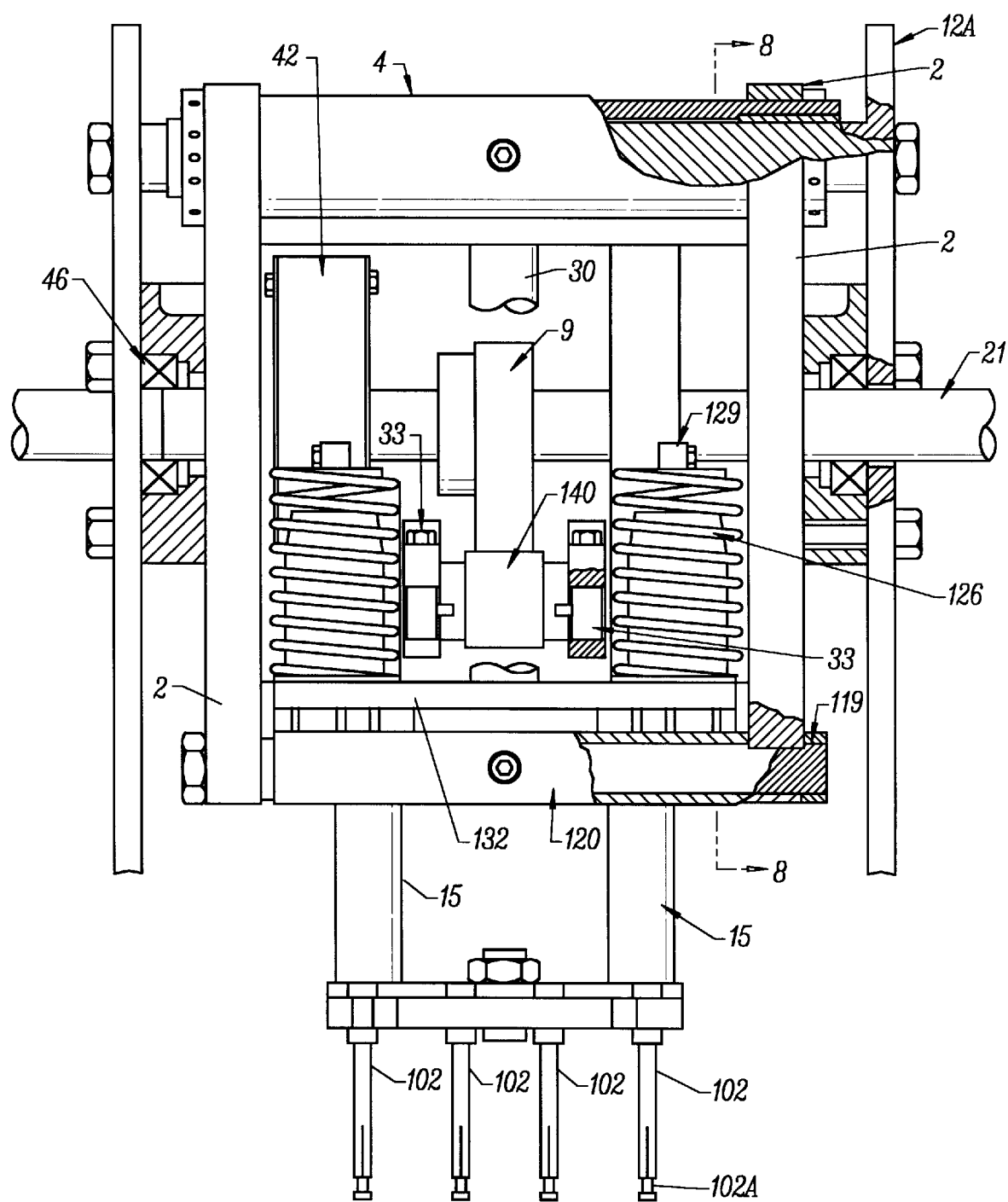
FIG. 7 is an enlarged elevational view of a portion of the conventional assembly of FIG. 4, with the pitting knife assembly in a raised position (in which springs 126 have relaxed back to their shortened, equilibrium position).
Figure 8:
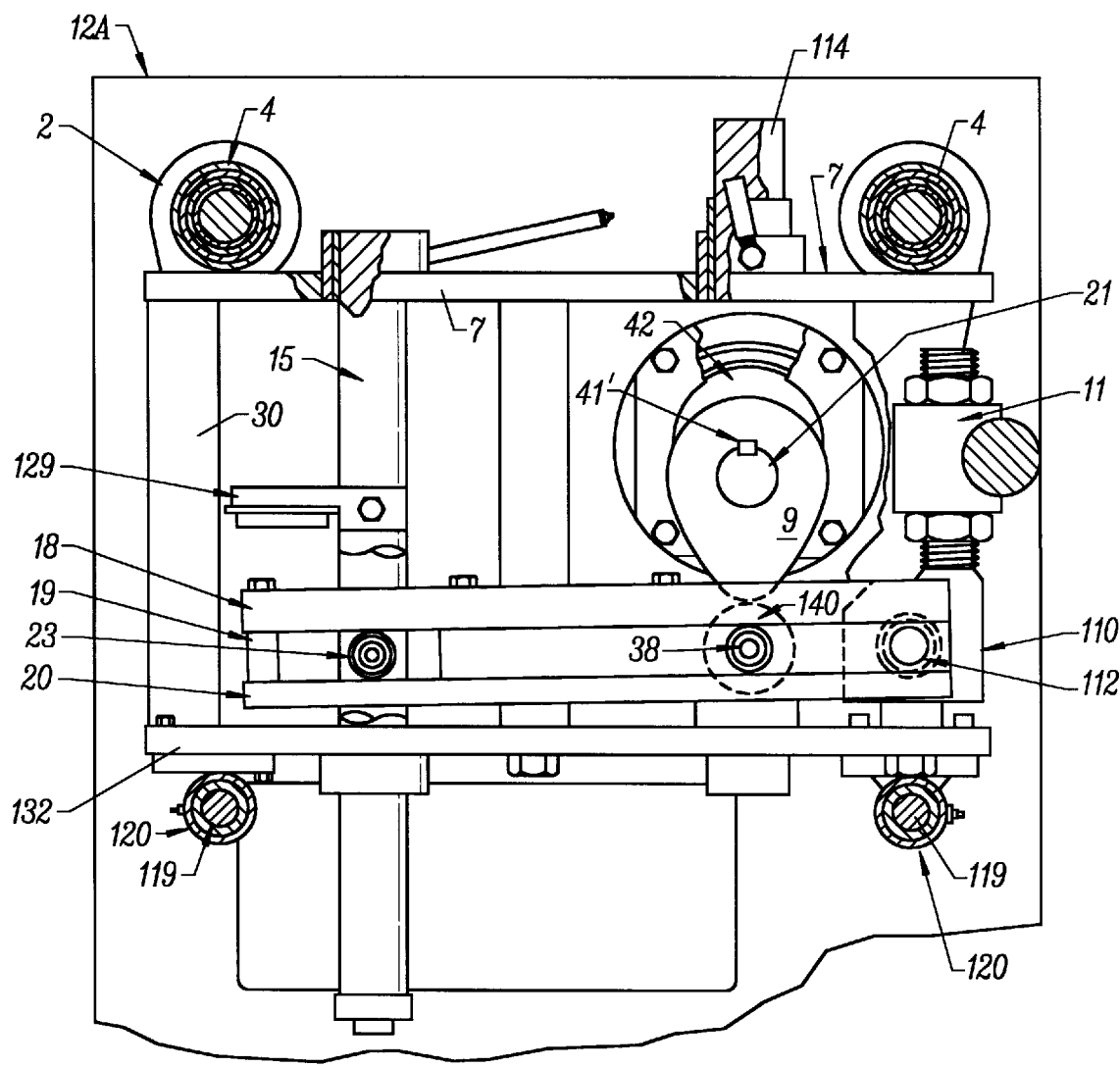
FIG. 8 is a cross-sectional view (along line 8—8 of FIG. 7) of the assembly of FIG. 7.
Figure 9:
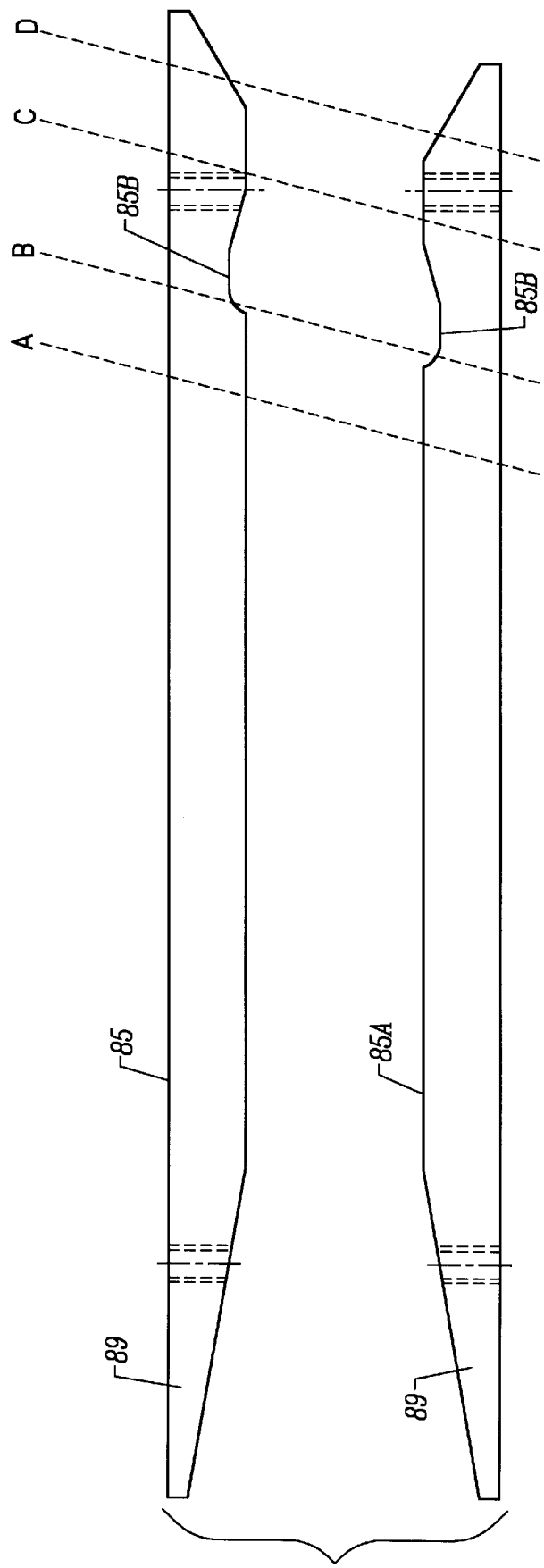
FIG. 9 is a top elevational view of a cam pair of the type used in the apparatus of FIGS. 4–8 (and which can be used in the FIG. 10 apparatus).
Figure 17:
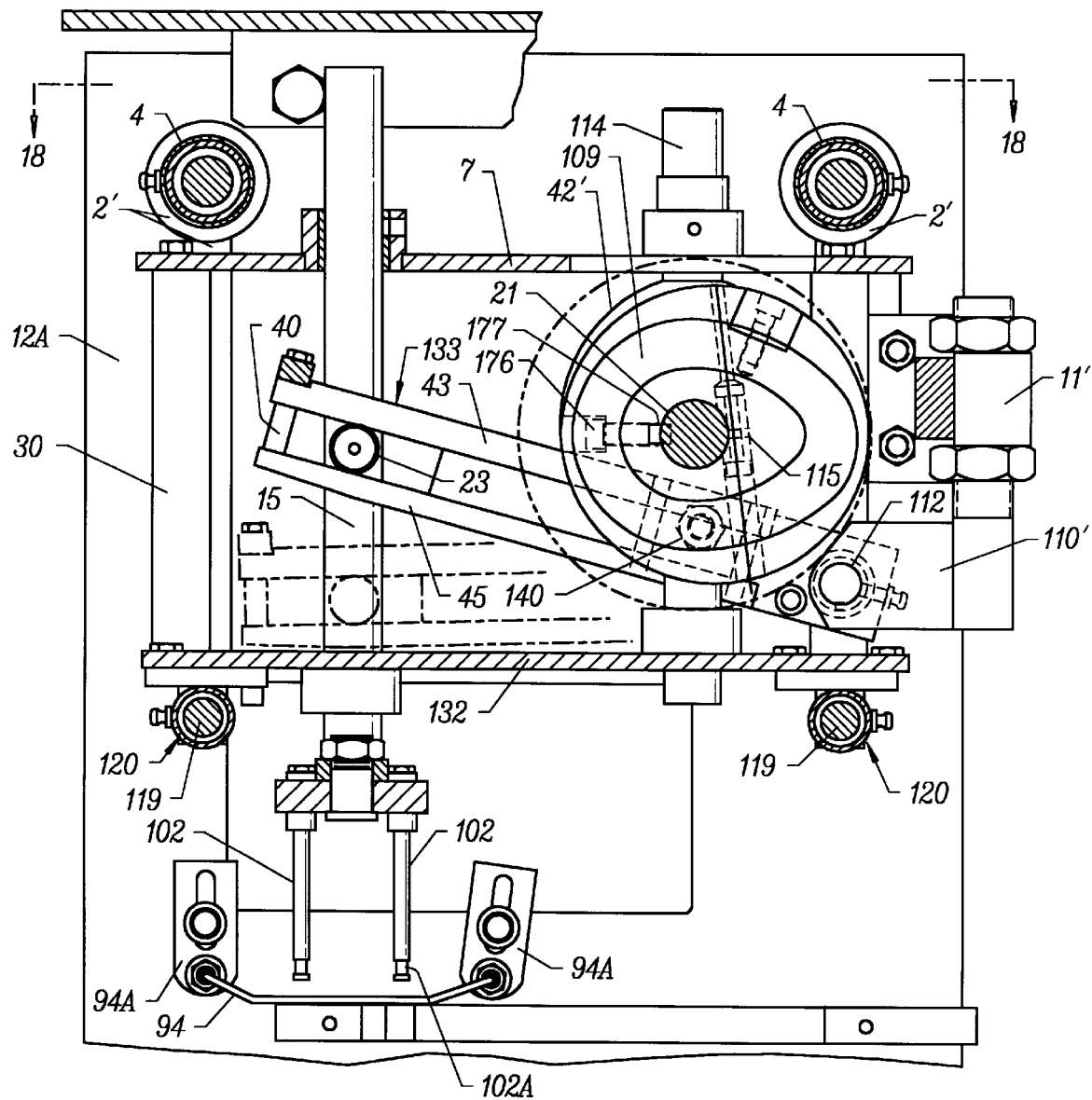
FIG. 17 is a cross-sectional view (in a vertical plane) of a portion of a preferred embodiment of the inventive pitting knife assembly (which can replace the pitting knife assembly of FIGS. 7 and 8 or that of FIG. 10).
Figure 18:
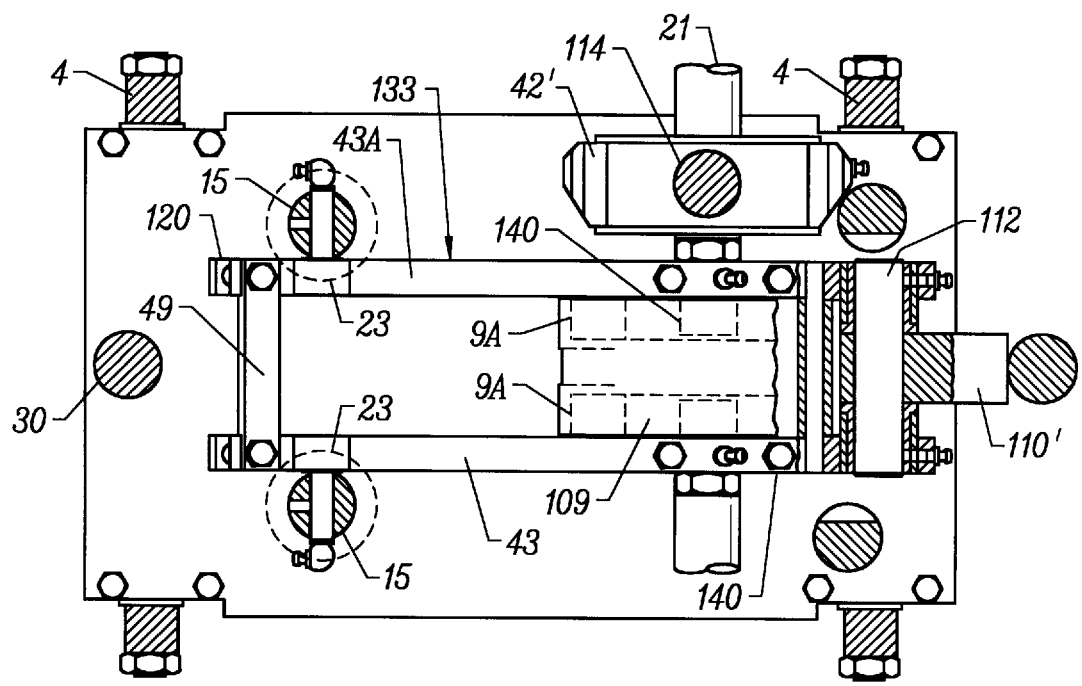
FIG. 18 is a cross-sectional view (along line 18—18 of FIG. 17) of the FIG. 17 assembly (with several elements omitted for clarity).

FIG. 17 is a cross-sectional view (in a vertical plane) of a portion of a preferred embodiment of the inventive pitting knife assembly (which can replace the pitting knife assembly of FIGS. 7 and 8 or that of FIG. 10). FIG. 18 is a cross-sectional view (along line 18—18 of FIG. 17) of the FIG. 17 assembly (with several elements omitted for clarity). The main difference between the conventional assembly of FIGS. 7 and 8 and the inventive assembly of FIGS. 17 and 18 is that the FIGS. 17/18 assembly employs box cam 109 to move a rocker arm assembly reciprocally (both up and down), rather than both a conventional cam 9 (to move a rocker assembly down during part of its cycle) and springs 126 (to move the rocker assembly up during the remaining part of its cycle).

The FIGS. 17/18 assembly includes several components which are identical to corresponding components in FIGS. 7 and 8, and which are identically numbered in FIGS. 7, 8, 17, and 18. These components have been described above, and their description will not be repeated below with reference to FIGS. 17 and 18.

The following components of the FIGS. 17/18 assembly differ from similar components of the FIGS. 7/8 assembly:

rocker arm unit 133 of FIGS. 17 and 18 has slightly different shape than rocker arm unit 33 of FIGS. 7/8; swing arms 2' of FIG. 17 have slightly different shape than swing arms 2 of FIGS. 7 and 8 (arms 2' have the same function as arms 2); eccentric 42' of FIGS. 17 and 18 has slightly different shape than eccentric 42 of FIGS. 7 and 8 (eccentric 42' has the same function as eccentric 42, and eccentric 42' is attached to member 114, at a bearing portion of member 114, with freedom to rotate relative to member 114); lower carriage plate 132 of the carriage of FIGS. 17 and 18 does not have centering plug portions of the type described with reference to FIGS. 7 and 8 (since the FIGS. 17/18 assembly lacks springs 126); and stroke adjustment bearing screw 110' and stroke adjusting support bar 11' of FIGS. 17/18 have slightly different shapes than stroke adjustment bearing screw 110 and support bar 11 of FIGS. 7/8 (members 110' and 11' have the same function as members 110 and 11). Bar 11' is fixedly attached to frame plate 12A. Before operating the apparatus, screw 110' can be repositioned relative to bar 11' in order to change the position of pin 112 and unit 133 (and thus shafts 15 engaged with unit 133) relative to frame plate 12A (and the entire frame of the apparatus) during operation.

Figure 19:
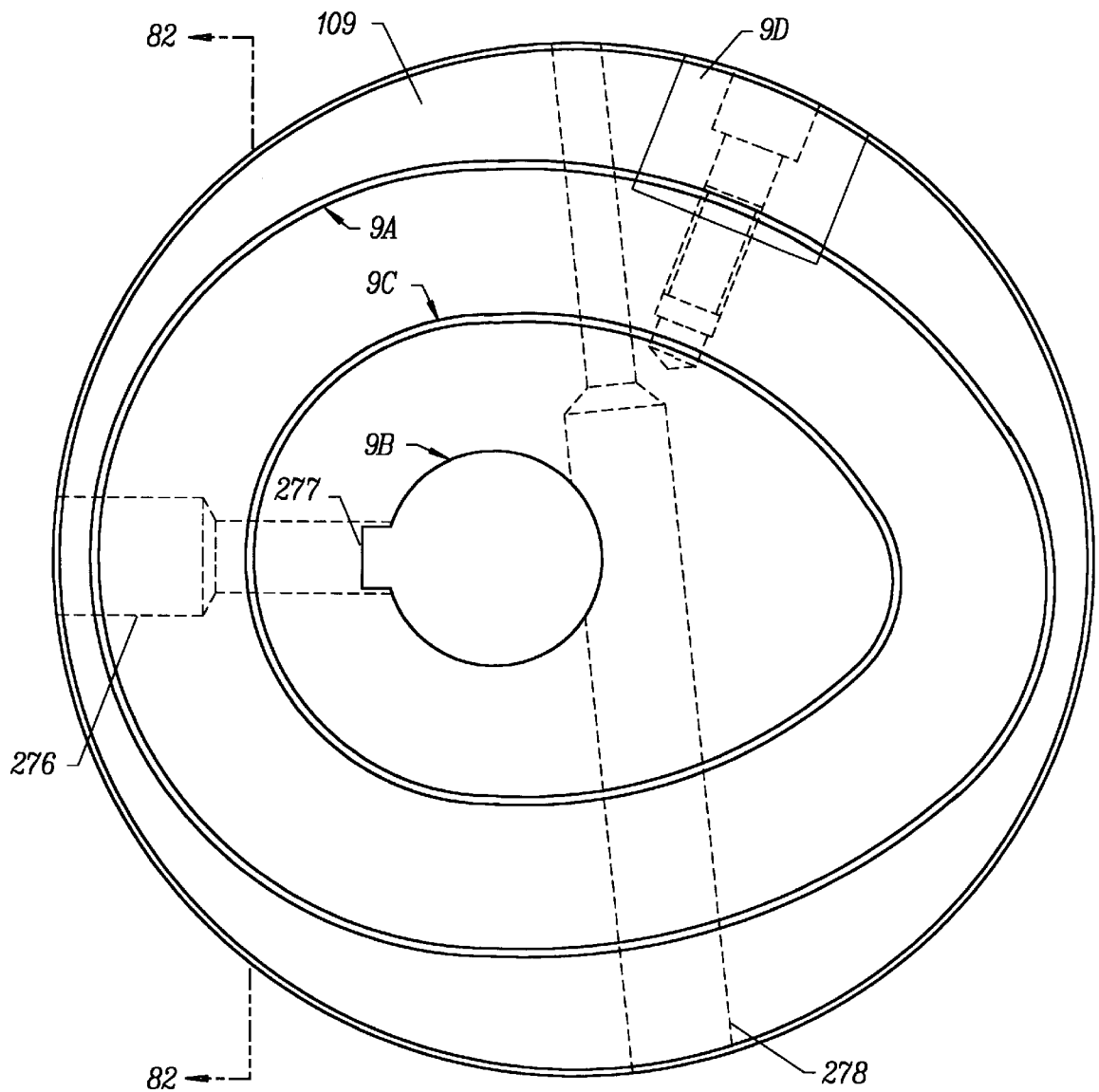
FIG. 19 is a cross-sectional view (in the plane of FIG. 17) of box cam 109 of the FIG. 17 assembly.
Figure 21:
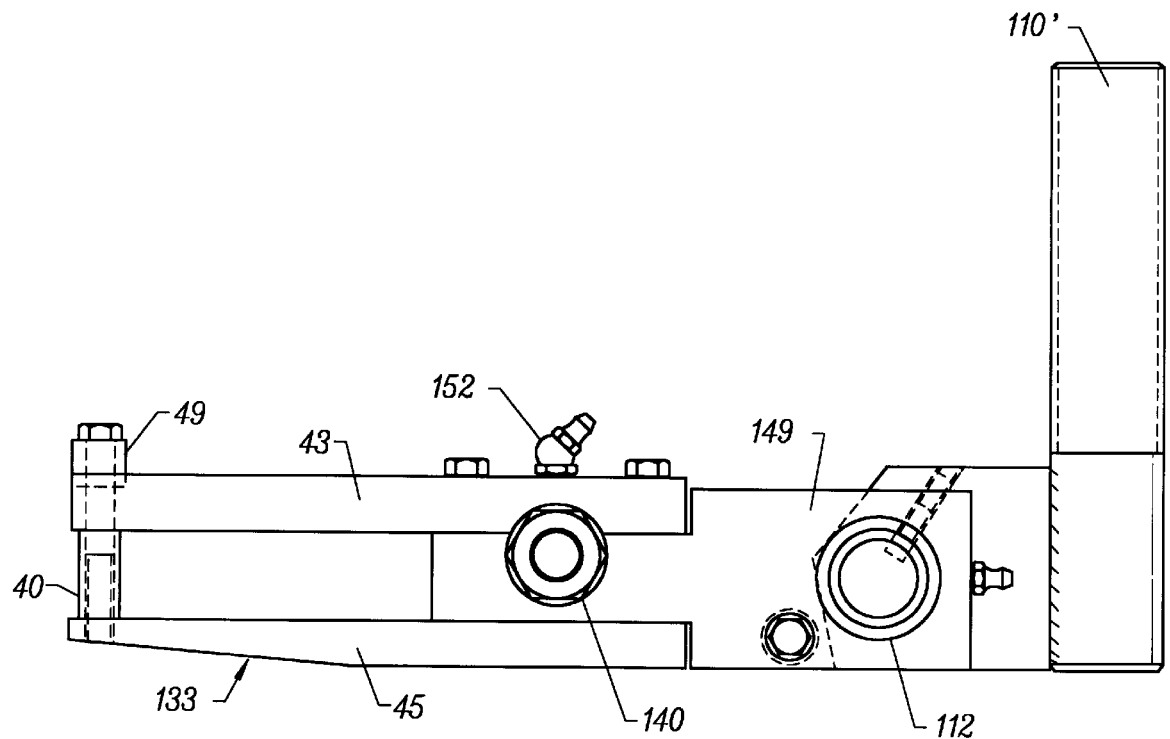
FIG. 21 is a side elevational of rocker arm unit 133 of the FIG. 17 assembly.
Figure 22:
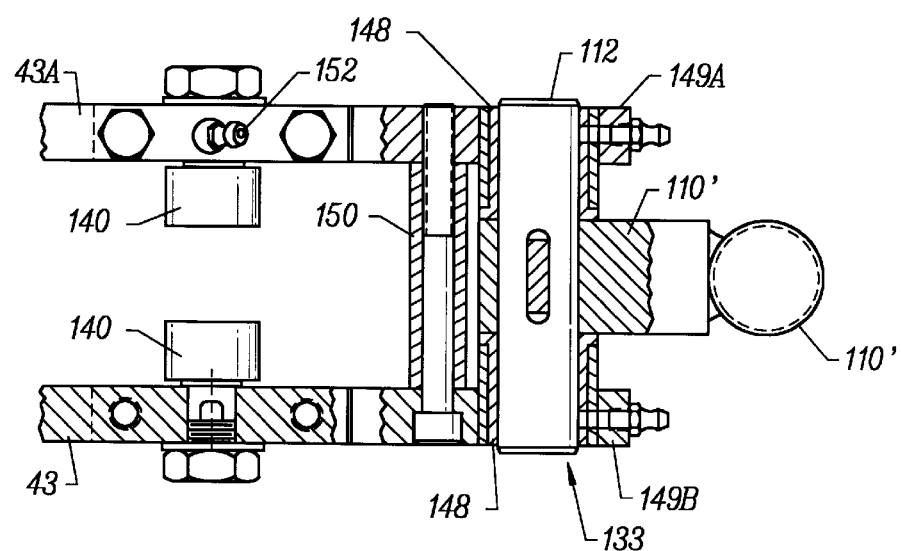
FIG. 22 is a top view of rocker arm unit 133 of FIG. 21.

Box cam 109 and rocker arm unit 133 will be described in detail with reference to FIGS. 19–22, as well as FIGS. 17 and 18. FIG. 19 is a cross-sectional view (in the plane of FIG. 17) of box cam 109 of the FIG. 17 assembly, FIG. 20 is a cross-sectional view of box cam 109 taken along line 82—82 of FIG. 19, FIG. 21 is a side elevational of rocker arm unit 133 of the FIG. 17 assembly, and FIG. 22 is a top view of rocker arm unit 133 of FIG. 21.

As best shown in FIG. 18, box cam 109 is fixedly mounted to shaft 21 (at a different location along the axis of shaft 21 than the location at which eccentric 42' is fixedly mounted) using set screw 176, key 177 and split clamp 115 (clamp 115 has two portions which can be tightened together) shown in FIG. 17. To mount cam 109 to shaft 21, key 177 is inserted in shaft 21. Then set screw 176 is inserted through channel 276 (best shown in FIG. 19) in cam 109 into tapped hole 277 (best shown in FIG. 19) in cam 109, and both the first and second portions of split clamp 115 are inserted in channel 278 in cam 109 (best shown in FIG. 19) with the radiused portion of the second portion of claim 115 aligned with channel 9B. Cam 109 is then positioned with respect to shaft 21 so that hole 277 of cam 109 is aligned with key 177. The latter step is accomplished by inserting shaft 21 (with key 177) through channel 9B (channel 9B extends through cam 109 as best shown in FIG. 20). Then, set screw 176 is advanced through channel 276 (best shown in FIG. 19) and hole 277, into engagement with key 177. To lock box cam 109 onto shaft 21, screw 176 is tightened against key 177 in shaft 21 and box cam 109, and the second portion of clamp 115 is tightened against shaft 21 and the first portion of clamp 115.

Figure 20:
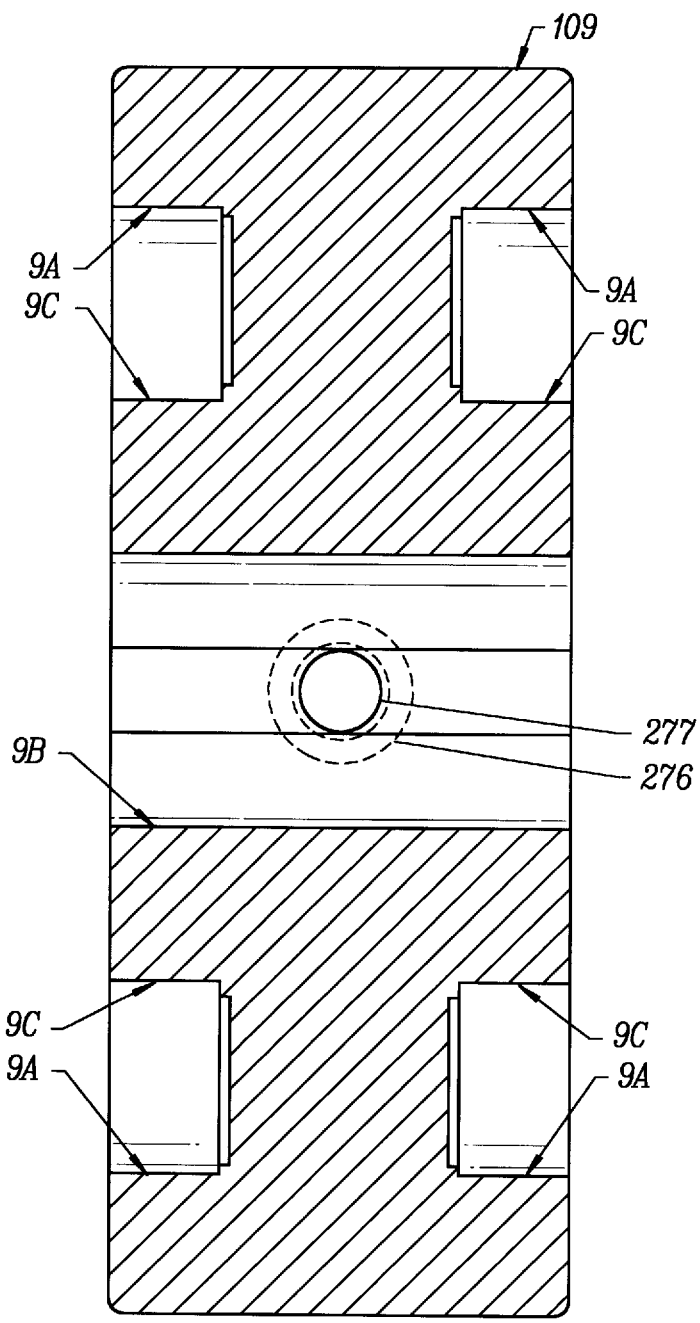
FIG. 20 is a cross-sectional view of box cam 109 of FIG. 19, taken along line 82—82 of FIG. 19.

Box cam 109 has a groove (a recessed portion) in each of its side faces (in each of the left and right faces of cam 109 as shown in FIG. 20). Each groove defines an outer cam surface 9A and an inner cam surface 9C opposed to the outer cam surface (as shown in FIG. 20). Cam surfaces 9A and 9C of one side face of cam 109 define an oblong, closed first cam track (as shown in each of FIGS. 17 and 19). Cam surfaces 9A and 9C of the other face of cam 109 define an oblong, closed second cam track which is a mirror image of the first cam track.

One cam follower 140 (shown in FIGS. 17, 18, 21, and 22) attached to upper arm 43 of rocker arm unit 133 between the fixed end of unit 133 (the end attached to pin 112) and the free end of unit 133 (the left end in FIG. 21) rides between cam surfaces 9A and 9C of the first cam track. Another cam follower 140 (shown in FIGS. 18, 21, and 22) attached to upper arm 43B of rocker arm unit 133 between the fixed end of unit 133 (the end attached to pin 112) and the free end of unit 133 (the left end in FIG. 5) rides between cam surfaces 9A and 9C of the second cam track. The first and second cam tracks are aligned, so that one cam follower 140 is always directly below (into the plane of FIG. 17) the other cam follower 140 when the knife assembly is viewed from the viewpoint of FIG. 17.

Box cam 109 has a removable insert portion 9D, which defines part of outer cam surfaces 9A when installed as shown in FIG. 19. Insert portion 9D is removed (from the rest of cam 109) to allow assembly of rocker arm unit 133 with box cam 109 (so that cam followers 140 ride properly between cam surfaces 9A and 9C of each cam track of cam 109). After cam 109 and unit 133 have been assembled together, insert 9D is reinstalled back to its position shown in FIG. 19.

A cam follower 23 protrudes from each of shafts 15 into engagement with unit 133 (near unit 133's free end) as shown in FIGS. 17 and 18.

Since each cam follower 140 always rides between an upper and a lower cam surface of cam 109 (regardless of the rotational orientation of shaft 21 and cam 109), cam 109 exerts an upward force on cam followers 140 (and thus on unit 133) during some portions of the rotational cycle of cam 109 and cam 109 exerts a downward force on cam followers 140 (and thus on unit 133) during the other portions of cam 109's rotational cycle. In particular, when the large radius portion of the aligned cam tracks (the cam track portion along which inner cam surfaces 9C are radially farthest from the central longitudinal axis of shaft 21) engages cam followers 140, cam 109 pushes followers 140 down, thus pivoting arm unit 133 counterclockwise about pin 112 (in the plane of FIG. 17), which causes arm unit 133 to force cam followers 23 downward, which in turn translates shafts 15 longitudinally downward relative to the carriage. Then, when continuing rotation of shaft 21 rotates the small radius portion of the aligned cam tracks (the cam track portion along which inner cam surfaces 9C are radially nearest to the central longitudinal axis of shaft 21) engages cam followers 140, cam 109 pushes followers 140 up, thus pivoting arm unit 133 clockwise about pin 112 (in the plane of FIG. 17), which causes arm unit 133 to force cam followers 23 upward, which in turn translates shafts 15 longitudinally upward relative to the carriage.

The term "box cam" is used throughout the specification (including in the claims) to denote a cam that includes at least one cam track capable of causing a cam follower engaged therewith to execute reciprocating motion as the box cam rotates. The term "reciprocating motion" denotes cyclical motion including motion in a first direction (at one moment of the cycle) and motion in the direction opposite the first direction (at another moment of the cycle). Thus, cam 9 of FIGS. 7 and 8 is not a box cam since cam 9 can drive cam follower 140 downward but not upward (when viewed as in FIG. 8) during a complete rotation of cam 9 about the axis of shaft 21. Rather, an externally supplied spring force (due to springs 126) is required to drive cam follower 140 of FIGS. 7 and 8 upward (when viewed as in FIG. 8).

Details of rocker arm unit 133 are best shown in FIGS. 21 and 22. Unit 133 includes member 149 (shown in FIG. 21). Pin 112 is pivotally attached to member 149 at one end of unit 133 (the right end of unit 133 in FIG. 21). Member 149 consists of portions 149A and 149B (shown in FIG. 22). Pin 112 is fixedly attached to stroke adjustment screw 110'. To attach unit 133 to pin 112, bearing 148 is installed around pin 112, portions 149A and 149B are then fitted around bearing 148 and pin 112, and portions 149A and 149B are then locked together. The remaining portion of unit 133 is fixedly attached to portions 149A and 149B (away from bearing 148). When so installed, unit 133 has freedom to pivot relative to pin 112 and screw 110' about the axis of pin 112 (with bearing 148 functioning to bear the load exerted by pivoting unit 133 on fixed pin 112 and to reduce friction between pivoting unit 133 and fixed pin 112).

Unit 133 includes upper arms 43 and 43A (shown in FIGS. 21 and 22) and lower arms 45 (there are two arms 45, only one of which is shown in FIGS. 17 and 21). One end of each of upper arms 43 and 43A and lower arms 45 is fixedly attached to body member 149, and spacer 150 is connected between arms 43 and 43A. Tie bar 49 and spacers 40 are connected between the other ends (the "free" ends) of arms 43, 43A, and 45, with bar 49 connected between the free ends of arms 43 and 43A (as best shown in FIG. 18), one spacer 40 connected between the free ends of arm 43 and the arm 45 below arm 43, and the other spacer 40 connected between the free ends of arm 43A and the arm 45 below arm 43A.

Preferably, the cam follower 140 rotatably attached to each of arms 43 and 43A (as best shown in FIG. 22) includes a roller (for engaging cam tracks of box cam 109) rotatably mounted to a threaded shaft. To mount the cam follower to arm 43 or 43A, the shaft is inserted through a hole in the arm and a nut is threaded onto the shaft to retain the cam follower in place. Preferably, a grease fitting 152 is provided at the location of each cam follower 140, to enable lubrication of the cam followers.

In operation of the inventive knife assembly, cam followers 140 ride in the cam tracks of box cam 109, thus forcing unit 133 to pivot relative to fixed pin 112 and screw 110'. As unit 133 pivots (clockwise or counterclockwise with respect to the central axis of pin 112), unit 133 drives shafts 15 longitudinally up or down, as follows. A cam follower 23 protrudes from one shaft 15 into the space between arm 43 and arm 45 below arm 43, and another cam follower 23 protrudes from the other shaft 15 into the space between arm 43A and arm 45 below arm 43A. Thus, cam followers 23 engage arms 43, 43A, and 45, and these arms force cam followers 23 up and down as they pivot with the rest of unit 133.

As unit 133 undergoes reciprocating pivoting motion in response to rotating box cam 109, the entire carriage assembly (including shafts 30, 15, and 114 and carriage plates 7 and 132) undergoes rocking motion in response to rotating eccentric 42'. More specifically, eccentric 42' is attached (at a bearing) to shaft member 114', with eccentric 42' having freedom to rotate relative to member 114'. As eccentric 42' rotates with shaft 21, eccentric 42' exerts force on member 114' which causes member 114' to undergo reciprocating motion as follows: the center of gravity of member 114' translates back and forth along an arc of a circle in the plane of FIG. 17, but member 114' does not rotate (about its center of gravity) in the plane of FIG. 17. This rocking motion of the carriage imparts a rocking component to the motion of shafts 15 (perpendicular to the longitudinal axes of shafts 15), which enables shafts 15 to translate knives 102 so as to follow translating specimens of fruit during periods when cam 109 is forcing shafts 15 (and thus knives 102) longitudinally downward into engagement with the fruit.

More generally, the inventive pitting knife drive assembly can be mounted in a fruit pitting apparatus (e.g., a pitting apparatus of the type shown in FIG. 10) to drive pitting knives of the pitting apparatus. The inventive pitting knife assembly includes a box cam (e.g., box cam 109 of FIGS. 17–20), means for rotating the box cam (e.g., drive shaft 21 and motor 24), a pivot unit which undergoes reciprocating pivoting motion in response to the rotating box cam (e.g., rocker arm unit 133 of FIGS. 17–18 and 21–22), and a set of one or more shafts to which pitting knives can be mounted (e.g., shafts 15 to which knives 102 can be mounted) which reciprocate longitudinally (in directions parallel to their longitudinal axes) in response to the reciprocating pivoting motion of the pivot unit. Preferably also, the pitting knife assembly includes a subassembly (e.g., shaft 114' and eccentric 42' and the carriage comprising arms 2', plates 7 and 132, and shaft 30 of FIGS. 17 and 18) for causing the shafts to undergo reciprocating motion in directions perpendicular to their longitudinal axes. A preferred implementation of the latter subassembly includes a carriage driven by a rotating eccentric (e.g., eccentric 42'), where the eccentric and the box cam are mounted along a common drive shaft, and the means for rotating the box cam include a motor for rotating the drive shaft (thereby rotating both the box cam and the eccentric).

Figure 23:
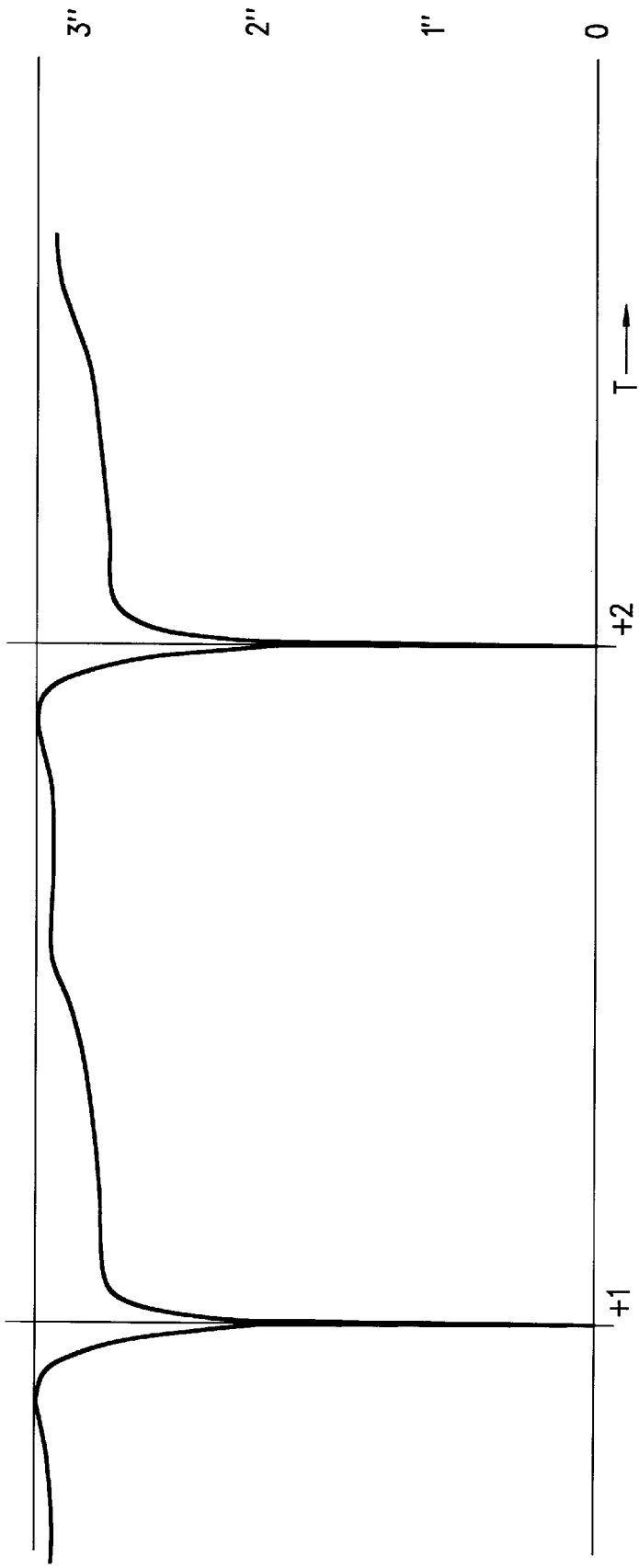
FIG. 23 is a graph representing the path of the tip of one of the pitting knives of the FIG. 17 assembly.

FIG. 23 is a graph representing the vertical position of the tip of one of the pitting knives 102 of the FIG. 17 assembly, as a function of time. FIG. 23 shows that the vertical position of the knife tip is cyclical, with pitting occurring at times t1 and t2. As is apparent from inspection of FIG. 23, the knife tip moves (vertically) very rapidly downward toward its lowest position (at each of pitting times t1 and t2), and very rapidly upward from its lowest position. This knife path desirably results in cleaner pitting of prunes (by vertical ejection of their pits), with less horizontal motion (and indeed without significant horizontal motion) of the knife relative to each prune when the knife is engaged with the prune, than can be achieved with the conventional assembly of FIGS. 7 and 8), and without the need for use of springs (e.g., springs 126 of FIGS. 7 and 8) as in the conventional assembly.

Figure 24:
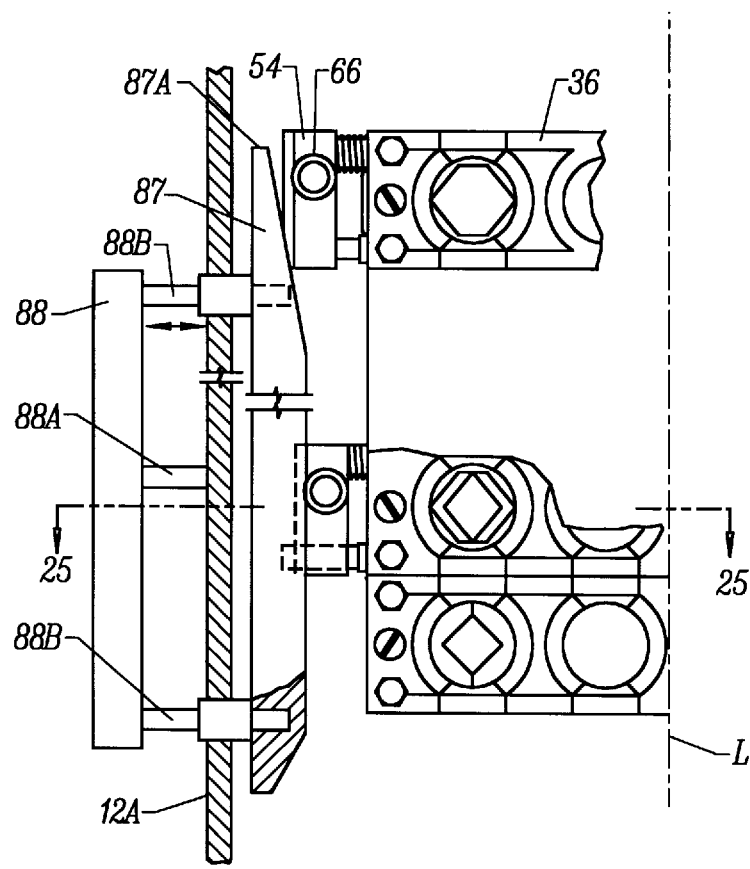
FIG. 24 is a top elevational view of a portion of an embodiment of the inventive pitting apparatus which includes an intermittent fruit holder conveyor drive, and an actively (e.g., pneumatically, or by solenoid) driven actuator assembly which moves a pair of cam tracks 87 to vary the force with which fruit holders grip the fruit during and after pitting.
Figure 25:
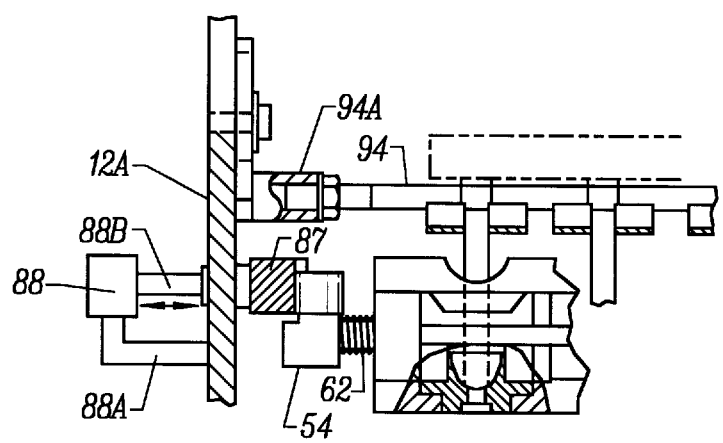
FIG. 25 is a cross-sectional view (along line 25—25 of FIG. 24) of the FIG. 24 apparatus.

We next describe another class of embodiments in which the pitting apparatus of the invention employs an intermittent fruit holder conveyor drive mechanism to accomplish pitting of prunes, dates, or similar soft fruit. These embodiments can be implemented as variations on the apparatus described above in which the holder conveyor drive mechanism translates the fruit holders (i.g., holders 36) into position for pitting, then keeps the holders stationary during pitting, and then translates the holders away from the pitting position (so that each holder undergoes intermittent motion). To improve the efficiency with which this class of embodiments separates the pitted fruit flesh (and pits) from the holders after pitting in accordance with the invention, each embodiment includes an actively (e.g., pneumatically, or by solenoid) driven actuator assembly 88 (as shown in FIGS. 24 and 25) is used to move (at appropriate times during the pitting cycle) a pair of cam tracks 87 to vary the force with which each fruit holder 36 grips fruit during and after pitting. Some embodiments in this class are identical to the conventional apparatus of FIGS. 1–9, modified to replace the continuous fruit holder conveyor drive with an intermittent drive, and further modified to replace notched cam tracks 85 and 85A with actuator assembly 88 and non-notched cam tracks 87 (as shown in FIGS. 24 and 25). Other embodiments in this class are identical to the apparatus of FIGS. 10–14, modified to replace the continuous fruit holder conveyor drive with an intermittent drive, and further modified to replace notched cam tracks 85 and 85A with actuator assembly 88 and non-notched cam tracks 87 (as shown in FIGS. 24 and 25). Still other embodiments in this class are identical to the apparatus of FIGS. 10–14, with the knife drive assembly replaced by the box cam knife drive assembly of FIGS. 17–22, and with the continuous fruit holder conveyor drive replaced by an intermittent drive, and with notched cam tracks 85 and 85A replaced by actuator assembly 88 and non-notched cam tracks 87 (as shown in FIGS. 24 and 25).

In each embodiment, the fruit holders have controllable pockets which can be controlled (by action of pitting head cam tracks on each holder) to open when desired (so as not to grip the fruit therewithin) and to close when desired (to grip the fruit therewithin). An example of such cam tracks are tracks 87 of FIGS. 24 and 25, to be mounted in the pitting head (e.g., in pitting head housing 22 of FIG. 10 apparatus, in place of tracks 85 and 85A).

FIG. 24 shows only one of tracks 87 (mounted to plate 12A), one actuator 88 coupled to track 87, and half of each of several holders 36 passing through the pitting head, but it should be understood that the other track 87 is symmetrically mounted to the plate 12A on the other side of center line L of FIG. 24, another track actuator 88 is coupled to the other track 87, and each holder 36 has four adjustable pockets, each adjustable pocket defined by a pair of spring-loaded pocket members 58 and 60. Each actuator 88 is fixedly mounted to one of side plates 112A (such as by rigid mounting member 88A) and is coupled to one of tracks 87 by members (such as movable members 88B) which are fixed relative to the track but movable relative to actuator 88.

When a holder 36 enters pitting head housing 22 (with tracks 87 mounted therein), the holder initially translates past the aligned input ends 87A of tracks 87 (as the top holder 36 in FIG. 24 is shown doing). Since the distance between tracks 87 at input ends 87A is relatively large, each spring 62, mounted between the main body of holder 36 and carrier 54 (or 56) at the end of holder 36 to spring-load the pockets into their open configuration, is relaxed in its elongated configuration (and rods 50 extending between carriers 54 and 56 are elongated) when the holder translates past the input ends 87A. Thus, the holder's pockets are in their open configuration (as are the pockets of the top holder 36 in FIG. 24).

Then, when each holder 36 advances between cam tracks 87 past the input ends 87A, the separation between the cam tracks decreases, and so the action of the cam tracks on carriers 54 and 56 shortens rods 50 (and compresses springs 62) to move the pockets into their closed configuration (as are the pockets of the two holders 36 at the bottom of FIG. 24). In this state, the holders stop (their intermittent motion enters its stationary period), and pitting knives engage the fruit gripped in the pockets to eject the pits from the fruit.

Then, while the holder remains stationary, actuators 88 pull tracks 87 away from each other (each actuator 88 pulls the adjacent track 87 toward it), thereby increasing the separation between tracks 87. As a result, springs 62 relax into their elongated state, lengthening the rods 50 and moving the pockets into their open configuration. Then, still while the holder is stationary, actuators 88 push tracks 87 back toward each other thereby decreasing the separation between tracks 87. As a result, tracks 87 compress springs 62 into their shortened state, shorten the rods 50 and move the pockets back into their closed configuration (the pockets remain in the closed configuration when the holder resumes translating motion). By so operating actuators 88 to move tracks 24 so as to open the pockets briefly (and then reclose them) after the pit removal operation (while the pitting knives remain engaged with the fruit in the pockets and the pockets remain stationary), the invention improves the efficiency with which the knives are withdrawn from the pitted fruit and with which the pitted fruit flesh is separated from the pockets.

In preferred embodiments, each actuator 88 includes a pneumatic cylinder configured to pull or push track 87 coupled thereto (to move the track to the left or right when viewed as in FIG. 24) in response to externally supplied (or internally generated) control signals. The control signals can be generated (in any of a number of well known ways) by a conventional timing system operating in synchronism with both the cyclical motion of the holder conveyor and the cyclical motion of the pitting knife assembly, so as to be useful to cause actuators 88 to open briefly and then reclose the holder pockets at appropriate times during each pitting cycle. In other preferred embodiments, each actuator 88 is a mechanical linear actuator configured to pull or push track 87 coupled thereto (to move the track to the left or right in FIG. 24) in response to externally supplied (or internally generated) control signals of the described type. In still other embodiments, each actuator 88 is an actuator of another type configured to pull or push track 87 coupled thereto (to move the track to the left or right in FIG. 24) in response to externally supplied (or internally generated) control signals as described.

In another class of embodiments, the invention is an apparatus for pitting fruit (e.g., prunes) of any of the types described above, but with one or more of its conveyors implemented as elastomeric timing belts rather than as metal chains (such as chain 35 looped around sprockets 32 and 34). Use of such timing belts eliminates problems which can result due to chain stretch and eliminates the need to lubricate metal conveyor chains.

The foregoing is merely illustrative and explanatory of preferred embodiments of the inventive apparatus. Various changes in the component sizes and shapes, and other details of the embodiments described herein may be within the scope of the appended claims.

What is claimed is:

1. A fruit pitting apparatus, including:

a frame;

holders having pockets dimensioned to hold soft fruit, each of the pockets being configured to be movable between an open configuration and a closed configuration;

a pitting knife assembly mounted to the frame and including a knife set and a knife drive assembly, wherein the knife set includes one or more pitting knives, and the knife drive assembly is coupled to the knife set and configured to drive the knife set along a pitting path relative to each of the holders so that the knife set executes a pitting operation at a pitting location;

a holder drive assembly coupled to the holders and configured to translate the holders around a closed loop so that each of the holders passes through the pitting location assembly while translating around the closed loop; and a wiping blade assembly mounted to the frame and including a fixedly mounted blade positioned to wipe pits from the holders as the holders translate away from the pitting location, wherein the blade has a flat body and a working edge, and the wiping blade assembly includes:

a mounting assembly fixedly attached to the frame, wherein the blade is fixedly mounted to the mounting assembly in an orientation such that the working edge extends toward the holders as said holders approach the wiping blade assembly.

2. The apparatus of claim 1, wherein the holders translate in a plane as they pass the wiping blade assembly, and the blade is fixedly mounted to the mounting assembly with the flat body oriented at an angle at least substantially equal to 60 degrees from said plane.

3. The apparatus of claim 1, wherein the blade is a metal plate and the working edge is a beveled edge of said plate.

4. The apparatus of claim 1, wherein the knife drive assembly is a box cam assembly comprising:
   a box cam;
   a box cam rotating assembly, coupled to the box cam and configure to rotate the box cam; and
   a pivot unit engaged with the box cam such that the pivot unit undergoes reciprocating pivoting motion in response to rotation of the box cam,
   wherein the pitting knife assembly includes a set of one or more pitting knife mounting shafts, wherein each of the pitting knife mounting shafts has a longitudinal axis and is engaged with the pivot unit so as to reciprocate longitudinally in response to the reciprocating pivoting motion of the pivot unit.

5. A fruit pitting apparatus, including:
   a frame;
   holders having pockets dimensioned to hold soft fruit, each of the pockets being configured to be movable between an open configuration and a closed configuration;
   a pitting knife assembly mounted to the frame and including a knife set and a knife drive assembly, wherein the knife set includes one or more pitting knives and the knife drive assembly is coupled to the knife set and configured to drive the knife set along a pitting path relative to each of the holders;
   a holder drive assembly coupled to the holders and configured to translate the holders intermittently around a closed loop such that each of the holders passes the pitting knife assembly while translating intermittently around the loop, and each of the holders is stationary relative to the frame each time the knife set performs a pitting operation on fruit in said each of the holders;
   an active assembly positioned to engage the holders as the holders pass the pitting knife assembly, and configured to cause the pockets of each of the holders to be in the closed configuration during the pitting operation and to move the pockets of said each of the holders from the closed configuration to the open configuration after the pitting operation thereby improving efficiency of separation of pitted fruit flesh from the holders after said pitting operation.

6. The apparatus of claim 5, wherein the active assembly is configured to cause the pockets of said each of the holders to move temporarily from the closed configuration to the open configuration after the pitting operation and then to return to the closed configuration.

7. The apparatus of claim 5, wherein the active assembly comprises:
   a pair of tracks mounted to the frame with freedom to move between a first position in which the tracks cause the pockets of said each of the holders to be in the closed configuration, and a second position in which said tracks cause the pockets of said each of the holders to be in the open configuration; and
   an actuator coupled to the tracks and configured to move the tracks between the first position to the second position in response to control signals.

8. The apparatus of claim 7, wherein the pockets of said each of the holders are biased in the open configuration, the tracks exert force on the holders thereby moving the pockets into the closed configuration when said tracks are in the first position, and the tracks allow the pockets to relax into the open configuration when said tracks are in the second position.

9. The apparatus of claim 7, wherein the knife drive assembly is a box cam assembly which includes:
   a box cam;
   a box cam rotating assembly, coupled to the box cam and configure to rotate the box cam; and
   a pivot unit engaged with the box cam such that the pivot unit undergoes reciprocating pivoting motion in response to rotation of the box cam,
   wherein the pitting knife assembly includes a set of one or more pitting knife mounting shafts, wherein each of the pitting knife mounting shafts has a longitudinal axis and is engaged with the pivot unit so as to reciprocate longitudinally in response to the reciprocating pivoting motion of the pivot unit.

10. The apparatus of claim 7, wherein the actuator is a pneumatically driven actuator.

11. The apparatus of claim 7, wherein the actuator is a solenoid-driven actuator.

12. A fruit pitting apparatus, including:
   a frame;
   holders having pockets dimensioned to hold soft fruit, each of the pockets being configured to exert variable gripping force on a specimen of fruit held thereby;
   a pitting knife assembly mounted to the frame and including a knife set and a knife drive assembly, wherein the knife set includes at least one pitting knife and the knife drive assembly is coupled to the knife set and configured to drive the knife set along a pitting path relative to each of the holders;
   a holder drive assembly coupled to the holders and configured to translate the holders intermittently around a closed loop such that each of the holders passes the pitting knife assembly while translating intermittently around the loop, and each of the holders is stationary relative to the frame each time the knife set performs a pitting operation on fruit in said each of the holders;
   an active assembly positioned to engage the holders as the holders pass the pitting knife assembly, and configured to move relative to the holders so as to vary the gripping force exerted by the pockets on specimens of fruit held in said holders during and after the pitting operation, thereby improving efficiency of separation of pitted fruit flesh from the holders after said pitting operation.

13. The apparatus of claim 12, wherein the active assembly comprises:
   a pair of tracks mounted to the frame with freedom to move between a first position in which the tracks cause the pockets of said each of the holders to be in a closed configuration, and a second position in which said tracks cause the pockets of said each of the holders to be in an open configuration; and
   an actuator coupled to the tracks and configured to move the tracks between the first position to the second position in response to control signals.

* * * * *

UNITED STATES PATENT AND TRADEMARK OFFICE
CERTIFICATE OF CORRECTION

PATENT NO.: 5,870,949
DATED: February 16, 1999
INVENTOR(S): Frederick J. Cimperman et al.

It is certified that errors appear in the above-identified patent and that said Letters Patent is hereby corrected as shown below:

In Column 10, line 33, "raised" should be --lowered--

In Column 10, lines 33-34, delete "(in which springs 126 have relaxed back to their shortened equilibrium position)"

In Column 11, line 63, "bin" should be --chute--

In Column 13, line 23, "holes" should be --slots--

<u>In the drawings</u>

Figure 11A:
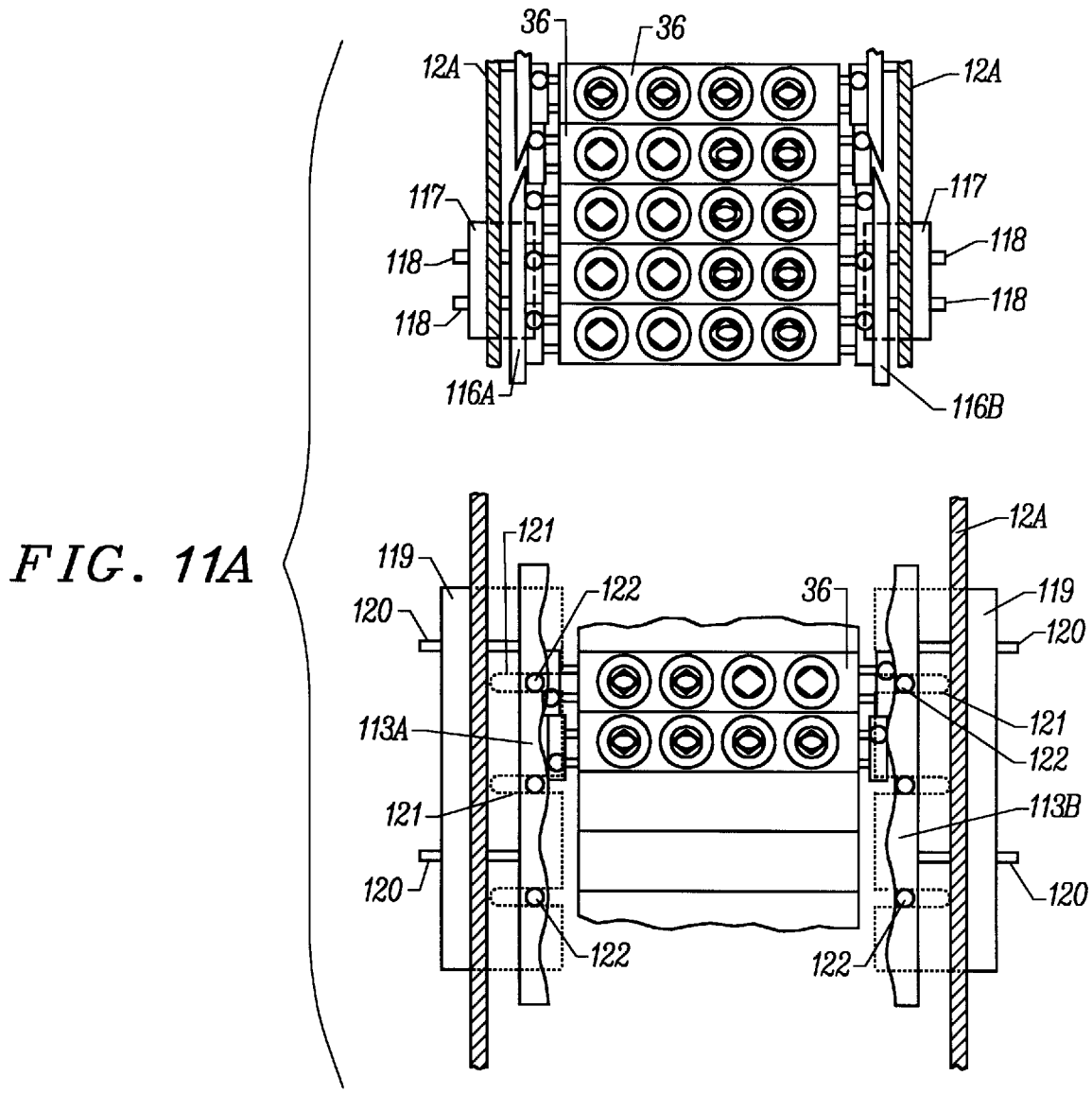
FIG. 11A is an end view of a portion of the FIG. 10 apparatus, showing assemblies 113 and 116.

Sheets 3, 10, 13, and 15, Figs 4, 11A, and 19 should be deleted and substitute therefor the attached Figs.

Signed and Sealed this

Twentieth Day of July, 1999

Attest:

Q. TODD DICKINSON

*Attesting Officer*  *Acting Commissioner of Patents and Trademarks*